United States Patent
Kong et al.

(10) Patent No.: US 10,943,563 B2
(45) Date of Patent: Mar. 9, 2021

(54) ELECTRONIC DEVICE AND DISPLAYING METHOD THEREOF

(71) Applicant: Samsung Electronics Co., Ltd., Gyeonggi-do (KR)

(72) Inventors: Kyu-Chul Kong, Gyeongsangbuk-do (KR); Songgeun Kim, Gyeongsangbuk-do (KR); Tae-Kyoung Kim, Gyeongsangbuk-do (KR); Hyesoon Jeong, Gyeongsangbuk-do (KR); Hyun-Suk Choi, Daegu (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/475,622

(22) PCT Filed: Oct. 25, 2017

(86) PCT No.: PCT/KR2017/011821
§ 371 (c)(1),
(2) Date: Jul. 2, 2019

(87) PCT Pub. No.: WO2018/128253
PCT Pub. Date: Jul. 12, 2018

(65) Prior Publication Data
US 2019/0325847 A1    Oct. 24, 2019

(30) Foreign Application Priority Data
Jan. 3, 2017    (KR) .................... 10-2017-0000634

(51) Int. Cl.
*G09G 5/14*    (2006.01)

(52) U.S. Cl.
CPC ......... *G09G 5/14* (2013.01); *G09G 2340/145* (2013.01)

(58) Field of Classification Search
CPC ...................... G09G 5/14; G09G 2340/145
See application file for complete search history.

(56) References Cited

U.S. PATENT DOCUMENTS 8,502,788 B2 *   8/2013   Cho .................... G06F 1/1652
                                                        345/173
2011/0128241 A1   6/2011   Kang et al.
(Continued)

FOREIGN PATENT DOCUMENTS

KR    1020090033949    4/2009
KR    1020150044427    4/2015
(Continued)

OTHER PUBLICATIONS

PCT/ISA/210 Search Report issued on PCT/KR2017/011821, pp. 7.
PCT/ISA/237 Written Opinion issued on PCT/KR2017/011821, pp. 5.

*Primary Examiner* — Abderrahim Merouan
(74) *Attorney, Agent, or Firm* — The Farrell Law Firm, P.C.

(57) ABSTRACT

Various embodiments of the present disclosure relate to a method and an apparatus for processing displaying of a display which includes a main region and a sub region in an electronic device. According to various embodiments of the present disclosure, it includes a display including a main region of a front and a sub region of at least one side extending from the main region and displaying an image based on at least part of the main region and the sub region, a memory, and a processor functionally coupled with the display and the memory, wherein the processor may be configured to sense at least part of the main region, generate imitation information for an extension screen based on the sensed region, and display the extension screen in the sub region in association with a main screen of the main region based on the imitation information. Various embodiments are possible.

19 Claims, 26 Drawing Sheets

(56) References Cited

U.S. PATENT DOCUMENTS

| | | | |
|---|---|---|---|
| 2013/0300697 A1* | 11/2013 | Kim | G06F 3/041 |
| | | | 345/173 |
| 2014/0253606 A1 | 9/2014 | Yun et al. | |
| 2014/0289668 A1* | 9/2014 | Mavrody | G06F 1/1643 |
| | | | 715/781 |
| 2014/0300557 A1* | 10/2014 | Cho | G09G 5/22 |
| | | | 345/173 |
| 2015/0138046 A1* | 5/2015 | Moon | G06F 3/165 |
| | | | 345/7 |
| 2015/0339055 A1* | 11/2015 | Cho | G06F 3/04842 |
| | | | 345/173 |
| 2016/0042494 A1 | 2/2016 | Baek | |
| 2016/0062648 A1 | 3/2016 | Jeong et al. | |
| 2016/0132222 A1 | 5/2016 | Yoo et al. | |
| 2016/0180558 A1 | 6/2016 | Kim | |
| 2016/0187994 A1 | 6/2016 | La et al. | |

FOREIGN PATENT DOCUMENTS

| | | |
|---|---|---|
| KR | 101580160 | 12/2015 |
| KR | 101580300 | 12/2015 |

* cited by examiner

ELECTRONIC DEVICE AND DISPLAYING METHOD THEREOF

PRIORITY

This application is a National Phase Entry of PCT International Application No. PCT/KR2017/011821, which was filed on Oct. 25, 2017, and claims priority to Korean Patent Application No. 10-2017-0000634, which was filed on Jan. 3, 2017, the content of each of which are incorporated herein by reference.

TECHNICAL FIELD

Various embodiments of the present invention relate to a method and an apparatus for processing displaying of a display in an electronic device.

BACKGROUND ART

An electronic device of various types such as a mobile communication terminal, a smart phone, a tablet personal computer (PC), a notebook, a personal digital assistant (PDA), a wearable device, a digital camera or a personal computer is widely used with recent development of digital technology. Recently, an electronic device, including a flexible display, having a curved display (or a bended display) implemented by combining the flexible display and the electronic device is developed and used. The flexible display indicates a display which may be bent and unfolded freely, and the curved display may indicate a display which maintains the curved form of the display in consideration of design.

The electronic device having the curved display may extend a display region to right and left sides of the electronic device, as well as the front of the electronic device. For example, if the curved display is applied to the electronic device, right and left edge portions of the display may be bended to make the screen look larger. According to one embodiment, the display panel may be variously changed and provided with 16:10, 16:11, not a standard resolution (e.g., 16:9).

DISCLOSURE OF INVENTION

Technical Problem

An electronic device having a curved display may provide an extension screen by modifying a standardized screen resolution ratio and expanding a display region using edge regions. Such an electronic device may cause difference from a main screen because the extension screen is provided as a bezel type regardless of the main screen. In addition, if the extension screen using the edge region is excluded from the electronic device having the curved display, there is a problem that a full screen size of the display may look small. Hence, a method for increasing the main screen to the edge region may be considered, but this method has a problem that the screen resolution ratio of the main screen is distorted and contents of the main screen are twisted.

Various embodiments disclose a method and an apparatus for displaying a main screen and an extension screen in an electronic device including an added or extended display.

Various embodiments disclose a method and an apparatus for displaying an extension screen in association with a main screen in a sub region of a display, without difference between the main screen and the extension screen.

Various embodiments disclose a method and an apparatus for displaying a screen in a sub region of a display by imitating (copying) whole or part of contents of a main screen.

Various embodiments disclose a method and an apparatus for extending a visible region through a sub region and adding a function for a user in the sub region without distorting an aspect ratio of a main screen.

Various embodiments disclose a method and an apparatus for, in extending a visible region using a sub region, addressing a different visibility problem of the sub region which may occur according to a change of a main screen.

Solution to Problem

An electronic device according to various embodiments of the present disclosure includes a display including a main region of a front and a sub region of at least one side extending from the main region and displaying an image based on at least part of the main region and the sub region, a memory, and a processor functionally coupled with the display and the memory, wherein the processor may be configured to sense at least part of the main region, generate imitation information for an extension screen based on the sensed region, and display the extension screen in the sub region in association with a main screen of the main region based on the imitation information.

A displaying method of an electronic device according to various embodiments of the present disclosure includes, if displaying a screen on a display, sensing at least part of a main region divided in the display, generating imitation information for an extension screen based on the sensed region, and displaying the extension screen in a sub region divided in the display in association with a main screen of the main region based on the imitation information, wherein the display may include the main region of a front and the sub region of at least one side extending from the main region, and displays an image based on at least part of the main region and the sub region.

To address the above problem, various embodiments of the present disclosure may include a computer readable recording medium for executing the method in a processor.

Advantageous Effects of Invention

According to an electronic device and its operating method according to various embodiments, the electronic device having a display which may divide and display a main region and a sub region may process displaying of the display more effectively. For example, if displaying the screen in the sub region of the electronic device, whole or part of contents of the main screen may be imitated (or copied). Thus, the sub region of the electronic device may display an extension screen (or a virtual screen) associated with the main screen without difference. According to various embodiments, the electronic device may extend the visible region without distorting an aspect ratio of the main display, and add functionality for a user in the extension screen using the sub region. According to various embodiments, if extending the visible region using the extension screen copied based on the main screen, different visibility problem of the sub region which may occur according to a change of the main screen may be addressed.

According to various embodiments, when displaying the screen in the sub region of the electronic device which is provided with various methods, it is possible to reduce the disconnection between the main screen and the extension screen displayed in the sub region by reference processing and displaying contents of the main screen. Hence, various embodiments may improve aesthetic in operating the display, and avoid the distortion of the main screen. According to various embodiments, touch malfunction may be addressed by using the sub region, and the difference in the screen switch may be reduced in displaying the screen (e.g., an imitation image for the extension screen, a virtual image of a function (or application) executed through the sub region) in the sub region.

According to various embodiments, by use of a sensor of the electronic device, malfunction of the touch by the sub region may be prevented and the aesthetic may be maximized through the application of extending the main screen based on the extension function if the electronic device is placed on the floor, and turning off the extension function if the user holds the electronic device with a hand (e.g., a grip state of the electronic device). The electronic device according to various embodiments may contribute to improvement of usability, ease and competitiveness of the electronic device.

BEST MODE FOR CARRYING OUT THE INVENTION

Figure 1:
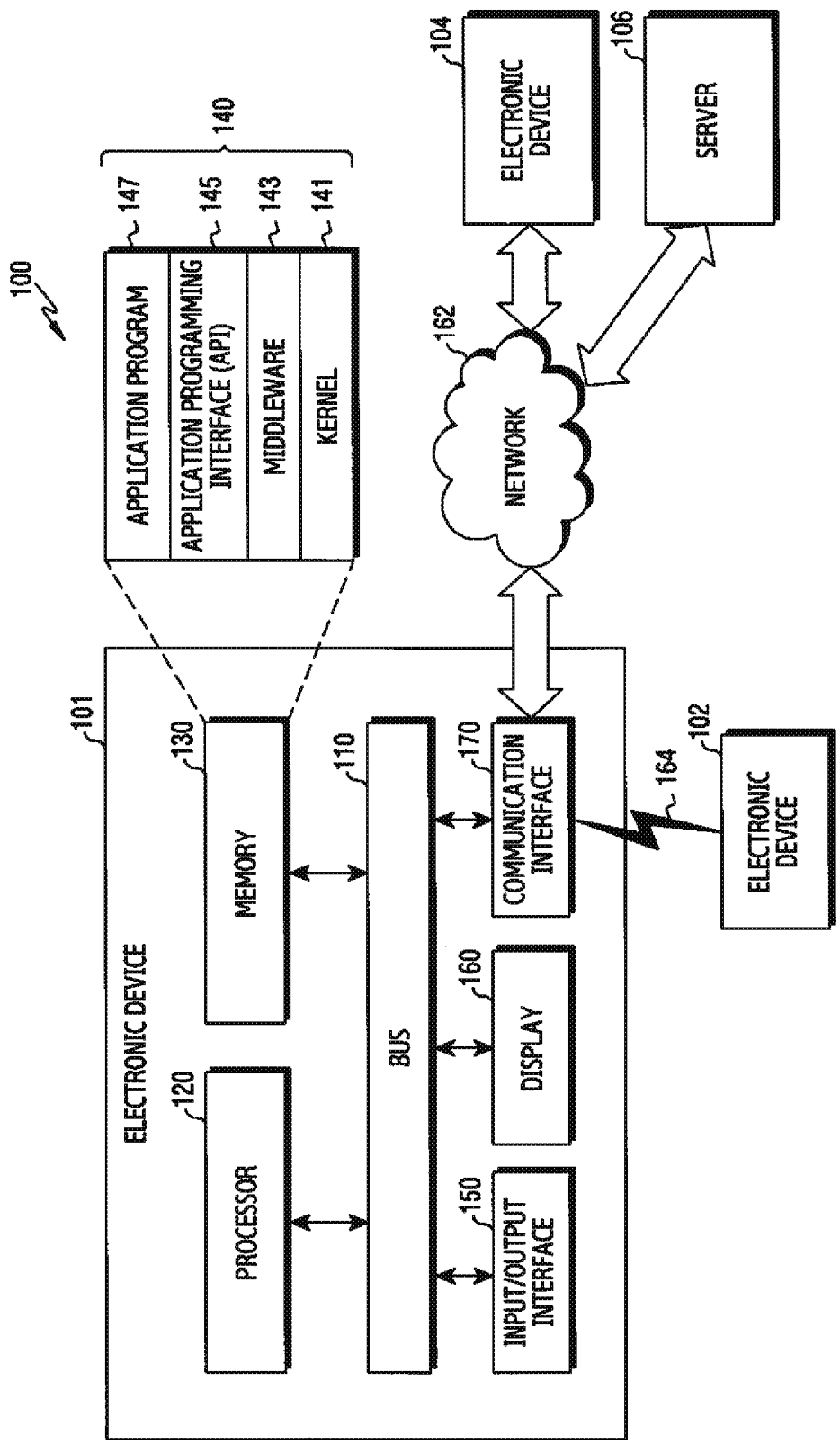
FIG. 1 illustrates a network environment including an electronic device according to various embodiments of the present disclosure.

Hereinafter, various embodiments of the present disclosure are disclosed with reference to the attached drawings. It should be understood that embodiments and terms used herein are not intended to limit technique described in the present disclosure to a particular embodiment form, but to cover various modifications, equivalents, and/or alternatives of the corresponding embodiments. In relation to descriptions of the drawings, like reference numerals may be used for similar components. The singular expression may include a plural expression, unless the context clearly dictates otherwise. In the present disclosure, an expression such as "A or B" or "at least one of A and/or B" may include all possible combinations of items listed. Expressions such as "first" "second" "primarily" or "secondary" may represent corresponding elements regardless of order or importance, are merely used to distinguish one element from other element, and do not limit corresponding elements. When it is described that an element (e.g., a first element) is "(operatively or communicatively) coupled" to or "connected" to another element (e.g., a second element), the element may be directly connected to the other element or may be connected through another element (e.g., a third element).

The expression "configured (or set) to" as used in the present disclosure may be used interchangeably with, for example, "suitable for", "having the capacity to", "adapted to", "made to", "capable of", or "designed to" according to the situation. The term "configured (or set) to" may not necessarily imply "specifically designed to" in hardware or in software. In some situation, an expression "apparatus configured to" may mean that the apparatus "can" operate together with another apparatus or other components. For example, a phrase "a processor configured (or set) to perform A, B, and C" may indicate a dedicated processor (e.g., an embedded processor) for performing a corresponding operation, or a generic-purpose processor (e.g., a central processing unit (CPU) or an application processor (AP)) which may perform corresponding operations by executing one or more software programs stored in a memory device.

An electronic device according to various embodiments of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (FDA), a portable multimedia player (PMP), an MPEG 3 (MP3) player, a medical equipment, a camera, or a wearable device. The wearable device may include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), or an implantable circuit. In some embodiments, the electronic device may include at least one of, for example, a television, a digital video disk (DVD) player, an audio, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic frame.

In another embodiment, the electronic device may include at least one of various medical devices (e.g., various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, or an ultrasonic wave device), a navigation device, a global navigation satellite system (GNSS), an event data recorder (EDR), a flight data recorder (FDR), a vehicle infotainment device, electronic equipment for ship (e.g., a navigation device for ship, a gyro compass, etc.), avionics, a security device, a head unit for a vehicle, an industrial or home robot, a drone, an automated teller machine (ATM) of a financial institution, a point of sales (POS) of a store, or an Internet of things (IoT) device (e.g., a light bulb, various sensors, a sprinkler device, a fire alarm, a thermostat, a street light, a toaster, sports equipment, a hot water tank, a heater, a boiler, etc.). According to an embodiment, the electronic device may include at least one of a portion of furniture, building/construction or vehicle, an electronic board, an electronic signature receiving device, a projector, or various measuring devices (e.g., water supply, electricity, gas, or electric wave measuring device). In various embodiments, the electronic device may be flexible, or a combination of two or more of the foregoing various devices. An electronic device according to an embodiment of the present disclosure is not limited to the foregoing devices. In the present disclosure, the term user may refer to a person using an electronic device or a device using an electronic device (e.g., an artificial intelligence electronic device).

FIG. 1 illustrates a network environment including an electronic device according to various embodiments.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data. In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program. The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may include, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. According to an embodiment, the wireless communication may include, for example, at least one of Bluetooth, Bluetooth low energy (BLE), Zigbee, Near Field Communication (NFC), magnetic secure transmission, radio frequency, or body area network (BAN). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS".

The wired communication may include at least one of, for example, a Universal Serial Bus (USB), a High Definition Multimedia Interface (HDMI), Recommended Standard 232 (RS-232), and a Plain Old Telephone Service (POTS).

The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

The server 106, for example, includes at least one of a voice processing server, a voice recognition server, a voice service providing server, a data server, a searching server, a settlement server, a card company server, a bank server, an authentication server, an application server, a management server, an integration server, a provider server (or communication operator server), a content server, an internet server, or cloud server.

Figure 2:
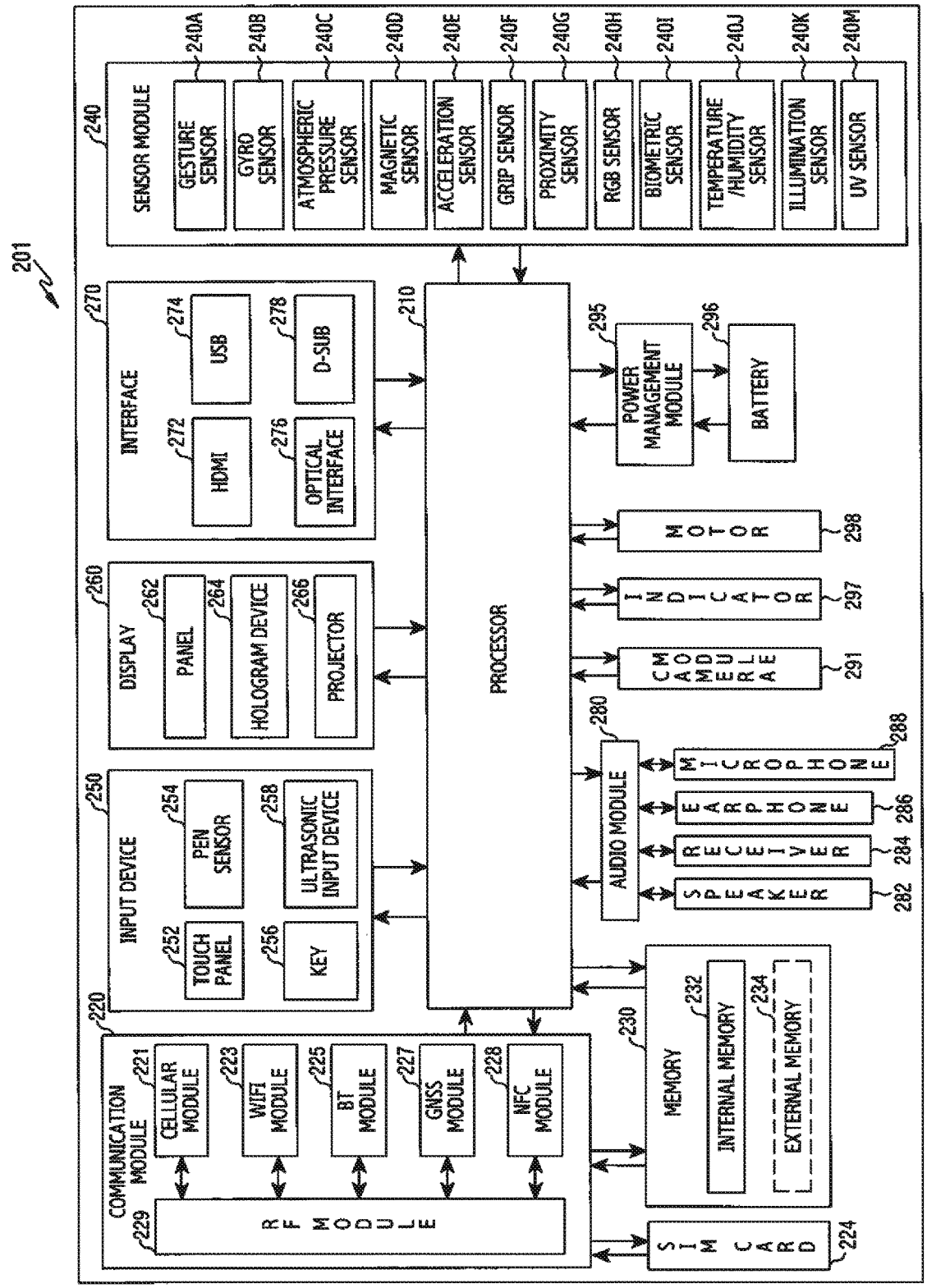
FIG. 2 is a block diagram of an electronic device according to various embodiments of the present disclosure.

FIG. 2 is a block diagram of an electronic device according to various embodiments.

For example, the electronic device 201 may include the whole or part of the electronic device 101 illustrated in FIG. 1. The electronic device 201 may include at least one processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module, 220, may have, for example, exact or similar configuration with the communication interface, 170, illustrated in FIG. 1. The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229. Although it is not illustrated, the communication module 220 may further include, for example, WiGig module (not illustrated). According to an embodiment, WiFi module 223 and WiGig module can be implemented as a form of one chip.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP). According to some embodiments, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The WiFi module 223 may represent, for example, a module for wireless internet access and forming wireless LAN link with external device (for example: external electronic device 102 or server 106, etc.). The WiFi module 223 can be embedded or enclosed in the electronic device 201. As a wireless internet technology, WiFi, WiGig, Wibro, world interoperability for microwave access (WiMax), high speed downlink packet access (HSDPA) or millimeter Wave (mmWave) can be used. The Wi-Fi module 223 may be directly connected to an electronic device, or may interwork with an external device (example: external electronic device 104) connected via a network (for example: wireless internet network)(for example: network 162) to transmit various data of the electronic device 201 to the outside or receive the data from the outside. The Wi-Fi module 223 may be kept on-state at all times or turned-on/turned-off according to the setting of the electronic device or user input.

The Bluetooth module 225 and the NFC module 228 may represent, for example, a short-range communication module for performing short-range communication. As a short-range communication technology, Bluetooth, bluetooth low energy (BLE), radio frequency identification (RFID), infrared communication (IrDA), ultra-wideband (UWB), Zigbee, or NFC may be used. The short-range communication module may interwork with an external device (for example: external electronic device 102) connected via a network (example: short-range communication network) to transmit various data of the electronic device 201 to the external device or receive the data from the external device. The short-range communication module (for example: Bluetooth module 225 or NFC module 228) may be kept on-state at all times or turned-on/turned-off according to the setting of the electronic device or user input.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (288) and identify data corresponding to the detected ultrasonic waves. According to various embodiments, the input device 250 may include an electronic pen. According to various embodiments, the input device 250 may be implemented to be inputted force touch.

The display 260 (for example, the display 160) may include a panel 262, a hologram device 264, a projector 266 and/or control circuitry for control these devices.

The panel 262 may be implemented to be, for example, flexible, transparent, or wearable. The panel 262 and the touch panel 252 may be implemented as one or more module. According to an embodiment, the panel 262 may include a pressure sensor (or a force sensor) for measuring the pressure of user's touch. The pressure sensor may be integrated with the touch panel 252 or may be implemented by one or more sensors separate from the touch panel 252

The panel 262 can be seated on the display 262 and can sense user input contacting or approaching the display 260 surface. The user input may include touch input or proximity input based on at least one of a single touch, multi-touch, hovering, or air gesture. The panel 262 may receive user input to initiate operations associated with use of the electronic device 201 in various embodiments, and may generate an input signal in accordance with the user input. The panel 262 may be configured to convert a change of a pressure applied to a particular area of the display or a capacitance occurring at a particular area of the display as an electrical input signal. The panel 262 can detect the location and area where the input tool (for example: user's finger, electronic pen or the like) is touched or approximated on the surface of the display 260. In addition, the panel 262 can be implemented to detect the pressure at the time of touch according to the applied touch method (for example: force touch).

The hologram 264 may show a three dimensional image in the air by using an interference of light. The projector 266 may display an image by projecting light onto a screen. The screen may be located, for example, inside or outside the electronic device 201.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like. The audio module 280 may transmit audio signal inputted from the processor 210 to output device (for example: a speaker 282, a receiver 284 or earphones 286) and transmit audio signal inputted from an input device (for example: a microphone 288) to the processor 210. The audio module 280 may convert audio sound data into audible sound and output the converted audible sound through an output device under the control of the processor 210, and convert audible sound received from an input device into digital signal and transmit to the processor 210.

The speaker 282 or receiver 284 may output audio data stored in the memory 230 or received from the communication module 220. The speaker 282 or receiver 284 may output an acoustic signal associated with various operations (functions) performed on the electronic device. The microphone 288 may receive an external acoustic signal and process it as electrical voice data. A variety of noise reduction algorithms may be implemented in the microphone to remove noise generated in receiving an external acoustic signal. The microphone 288 may be responsible for input of audio streaming, such as voice commands.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge.

The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic device 201 or a part (e.g., the processor 210). The motor 298 may convert an electrical signal into mechanical vibration, and may generate vibration, a haptic effect, or the like.

The electronic device 201 may include, for example, a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or media-FLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
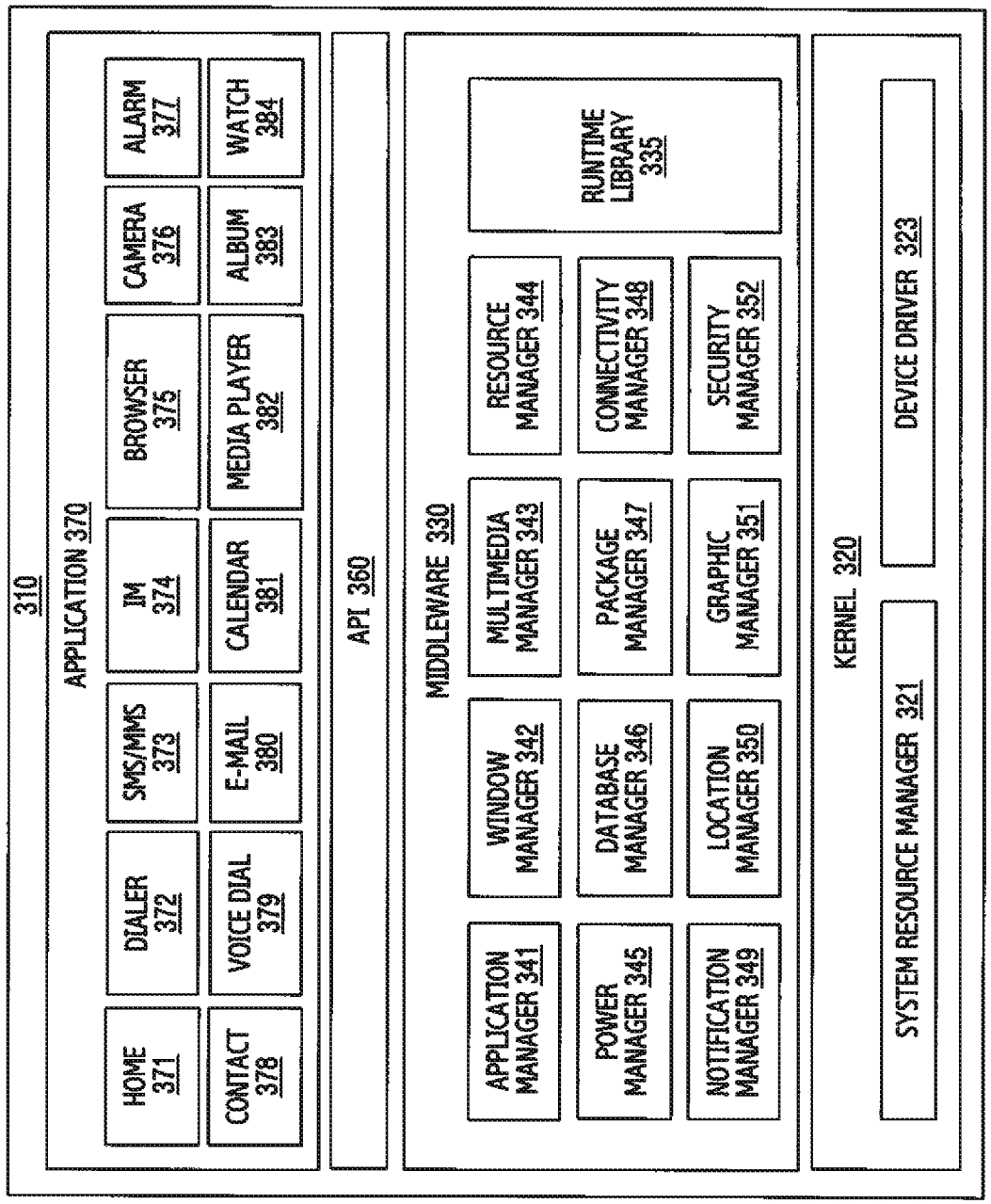
FIG. 3 is a block diagram of a program module according to various embodiments of the present disclosure.

FIG. 3 is a block diagram of a program module according to various embodiments.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

Referring to FIG. 3, the program module 310 may include a kernel 320 (for example, kernel 141), middleware 330 (for example, middleware 143), an API 360 (for example, API 145), and/or an application 370 (for example, application program 147). At least some of the program module 310 may be preloaded on the electronic device, or may be downloaded from an external electronic device (e.g., the electronic device 102 or 104, or the server 106).

The kernel 320 may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide a function required by the applications 370 in common or provide various functions to the applications 370 through the API 360 so that the applications 370 can efficiently use limited system resources within the electronic device.

According to an embodiment, the middleware 330 may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device.

The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like.

According to an embodiment, the middleware 330 may further include a telephony manager for managing a voice call function or a video call function of the electronic device or a middleware module that forms a combination of various functions of the above-described elements. According to an embodiment, the middleware 330 may provide a module specialized for each type of OS. Also, the middleware 330 may dynamically delete some of the existing elements, or may add new elements.

The API 360 is, for example, a set of API programming functions, and may be provided with a different configuration according to an OS. For example, in the case of Android or iOS, one API set may be provided for each platform, in the case of Tizen, two or more API sets may be provided for each platform.

The applications 370 may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, and clock 384. According to various embodiments, the application 370 may include health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of description) supporting information exchange between the electronic device and an external electronic device. The application associated with information exchange may include, for example, a notification relay application for forwarding specific information to an external electronic device, or a device management application for managing an external electronic device.

For example, the notification relay application may include a function of delivering, to the external electronic device, notification information generated by other applications of the electronic device or receiving notification information from an external electronic device and providing the received notification information to a user.

The device management application may install, delete, or update, for example, a function for the external electronic device communicating with the electronic device (for example, turning on/off the external electronic device itself (or some elements thereof) or adjusting brightness (or resolution) of a display), or applications executed in the external electronic device.

According to an embodiment, the applications 370 may include applications (for example, a health care application of a mobile medical appliance or the like) designated according to attributes of the external electronic device.

According to an embodiment, the application 370 may include an application received from the external electronic device. At least some of the program module 310 may be implemented (executed) in software, firmware, hardware (for example, processor 210), or a combination of two or more thereof, and at least some of the program module 310 may include a module, a program, a routine, a set of instructions, and/or a process for performing one or more functions.

The term "module" used in the present disclosure includes a unit including hardware, software, or firmware, and, for example, may be interchangeably used with terms such as logic, logical block, component, or circuit. "module" may be an integral component or a minimum unit for performing one or more functions or its part. "module" may be mechanically or electrically implemented, and, for example, may include an application-specific integrated circuit (ASIC) chip, a field-programmable gate arrays (FPGAs), and a programmable logic device, which are known or will be developed, for conducting certain operations.

At least part of a device (e.g., modules or functions thereof) or a method (e.g., operations) according to various embodiments may be implemented with an instruction stored in a computer readable storage medium (e.g., the memory 130) in the form of a program module. If the instruction is executed by a processor (e.g., the processor 120 of FIG. 1 or the processor 210 of FIG. 2), the processor may perform a function corresponding to the instruction.

The computer readable recording medium may include a hard disk, a floppy disc, magnetic media (e.g., a magnetic tape), optical storage media (e.g., a compact disc-ROM (CD-ROM) or a DVD, magnetic-optic media (e.g., a floptical disc)), an internal memory, and so on. The instruction may include code created by a compiler or code executable by an interpreter.

According to various embodiments, the recording medium may include a computer readable recording medium which records a program for executing various methods to be described at the processor 120 or 210.

The module or program module according to various embodiments may include at least one or more of the aforementioned components, omit some of them, or further include other components. Operations performed by the module, the program, or another component according to various embodiments may be carried out sequentially, in parallel, repeatedly, or heuristically, or at least some operations may be executed in a different order or omitted, or other operations may be added.

Various embodiments of the present disclosure are related to processing displaying of a display in an electronic device, and disclose a method and an apparatus for displaying a main screen and an extension screen in the electronic device including an added or extended display. According to various embodiments, if providing the extension screen using a sub region of the display, the extension screen of the sub region may be displayed without difference from the main screen. According to various embodiments, the extension screen (e.g., an imitation image) may be generated by copying (or imitating) whole or part of contents of the main screen, and the extension screen may be displayed in the sub region in association with the main screen of the main region.

According to various embodiments, by maintaining the main screen of the main region and providing the extension screen which imitates whole or part of the main screen in the sub region, a visible region may be extended without distorting the aspect ratio of the main screen. According to various embodiments, if extending the visible region using the extension screen copied based on the main screen, the different visibility problem of the visible region based on a change of the main screen may be addressed.

In various embodiments, the electronic device may include any device which uses one or more of various processors such as AP, CP, GPU, and CPU. For example, the electronic device according to various embodiments, may include an information communication device, a multimedia device, a wearable device, an IoT device, or other various devices corresponding to these devices.

Hereafter, an operating method and an apparatus according to various embodiments of the present disclosure are provided by referring to the accompanying drawings. However, since various embodiments of the present disclosure are not limited or restricted by the contents described in the following, it should be noted that they may be applied to various embodiments based on the following embodiment. In various embodiments of the present invention to be described below, a hardware approach will be described as an example. However, since the various embodiments of the present disclosure include a technology using both hardware and software, the various embodiments of the present disclosure do not exclude a software-based approach.

Figure 4:
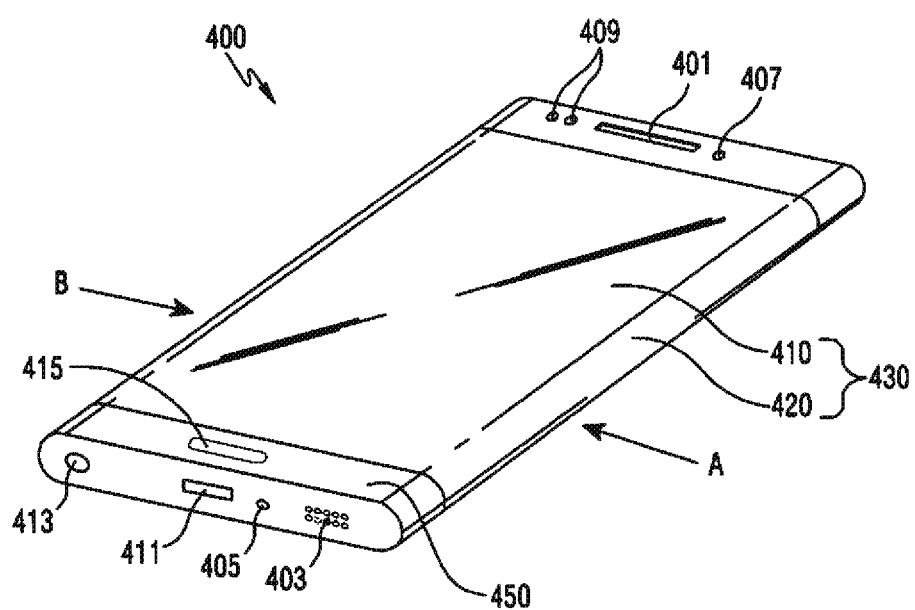
FIG. 4 illustrates an example of an electronic device according to various embodiments of the present disclosure.

FIG. 4 illustrates an example of an electronic device according to various embodiments of the present disclosure.

Referring to FIG. 4, in various embodiments, an electronic device 400 may be configured by including a display 430, a housing (or a main body) 450 for receiving and coupling with the display 430, and an additional device formed in the housing 450 and performing a function of the electronic device 400. In various embodiments, the additional device may include a first speaker 401, a second speaker 403, a microphone 405, a sensor (e.g., a front camera 407, an illumination sensor 409, etc.), a communication interface (e.g., a charging or data input/output port 411, an audio input/output port 413, etc.), a button 415, and so on.

In various embodiments, the electronic device 400 is described as the electronic device having the curved display 430 by way of example, but not limited thereto. For example, in various embodiments, the electronic device 400 may include an electronic device having a flexible display or a flat display which may operate a display region as a main region and a sub region, and extend and use the screen through the sub region.

In various embodiments, the display 430 may include a flat display or a curved display (or a bended display) which may bend, curve or roll without damage though a thick and flexible substrate like paper. In various embodiments, the curved display 430 may be fastened to the housing (or a bezel, the main body) 450 and maintain the curved shape. In various embodiments, it is described that the display 430 of the electronic device 400 is implemented with the curved display type by way of example, but is not limited thereto. For example, the electronic device 400 may be implemented with a display which may freely bend or unfold such as the flexible display, as well as the curved display 430.

In various embodiments, the display 430 may give flexibility to fold and unfold, by replacing a glass substrate surrounding the liquid crystal in an LCD, an LED, an OLED, or an AMOLED with a plastic film.

In various embodiments, the display 430 may include an active matrix screen of a specific screen size (e.g., 3 inches, 4 inches, 4.65 inches, 4.8 inches, 5 inches, 6.5 inches, 7.7 inches, 8.9 inches, 10.1 inches, etc.) according to the size of the electronic device 400. According to various embodiments, the display 430 may be extended to at least one side (e.g., at least one surface of a left side, a right side, an upper side, or a lower side) of the electronic device 400, bend below a radius of curvature (e.g., the radius of curvature 5 cm, 1 cm, 7.5 mm, 5 mm, 4 mm, etc.) allowing the operation of the curved display, and thus be fastened to a side of the housing 450. It is not limited thereto, and the display 430 according to various embodiments may be implemented in a right angle shape without the radius of curvature.

In various embodiments, a region presented on the front of the display 430 may be referred to as a main region 410, and a region extending from the main region 410, bending to at least one side (e.g., see reference numerals A, B of FIG. 4) of the housing 450, and presented on the side of the housing 450 may be referred to as a sub region 420. In various embodiments, a screen displayed in the main region 410 may be referred to as a main screen, a screen displayed in the sub region 420 by extending the main screen may be referred to as an extension screen, and a screen displayed by a function (or an application) allocated to the sub region 420 may be referred to as a sub screen.

In various embodiments, the main region 410 and the sub region 420 are divided to ease the descriptions, and they do not indicate the physically separated forms. According to various embodiments, the main region 410 and the sub region 420 have a form with at least one terminal end bended, and may be implemented by one curved display 430 with the at least one terminal end bended extending to at least one side of the electronic device 400. In various embodiments, the at least one terminal end bended may be implemented by extending to the back of the electronic device 400 according to the implementation type of the display 430.

In various embodiments, image processing by the main region 410 may be performed by a processor (e.g., an AP) of the electronic device 400. In various embodiments, the sub region 420 may be managed by a display control circuit (e.g., a display driver IC (DDI)) which provides an electric signal (e.g., a multi high voltage level (MHVL) signal) from the electronic device 400 to a display panel (not shown). In various embodiments, the image processing for the main region 410 and the sub region 420 is dispersed and processed in the processor and the display control circuit, to thus reduce consumption current of the processor consumed in the image processing for the display 430. It is not limited thereto, and, according to various embodiments, the image processing for the main region 410 and the sub region 420 may be processed by any one processor.

In various embodiments, the display 430 may support input and output, and process the input and the output by the main region 410 and the sub region 420 simultaneously or individually. In various embodiments, image processing operation examples of the main region 410 and the sub region 420 are described with reference to the drawings to be explained.

According to various embodiments, if the main region 410 is not used as in the main region 410 hidden by a cover (not shown) of the electronic device 400, the main region 410 may be non-displayed by outputting the main region 410 in monochrome (e.g., in black) by the processor. Alternatively, the main region 410 may be non-displayed by separating power of the main region 410 and the sub region 420 and blocking power supply to the main region 410. In this case, the display control circuit may process and display an image relating to the displaying of the sub region 420 according to the operation of the electronic device 400.

According to various embodiments, using a sensor of the electronic device 400, it is possible to determine whether the electronic device 400 is placed on the floor, or is held (or gripped) by the user. According to various embodiments, if the electronic device 400 is placed on the floor, the main screen of the main region 410 may be provided by extending to the sub region 420 based on the extension function according to various embodiments. According to various embodiments, while the electronic device 400 is held (or gripped) by the user, touch malfunction by the sub region 420 may be prevented by automatically disabling (or turning off) the extension function.

According to various embodiments, white its illustrations and descriptions are omitted hereafter, a right hand mode and a left hand mode of the electronic device 400 may be defined using environment setting provided at the electronic device 400, a separate application, or user's hold (or grip) state detection. The electronic device 400 may process the input and the output using only the sub region 420 of the side corresponding to a relevant mode. For example, if the electronic device 400 is set to the right hand mode in the example of FIG. 4, the input and the output may be conducted through the sub region 420 on the right side A, for example, when viewed from the front of the electronic device 400. As another example, if the electronic device 400 is set to the left hand mode in the example of FIG. 4, the input and the output may be conducted through the sub region 420 on the left side B, for example, when viewed from the front of the electronic device 400.

Figure 5:
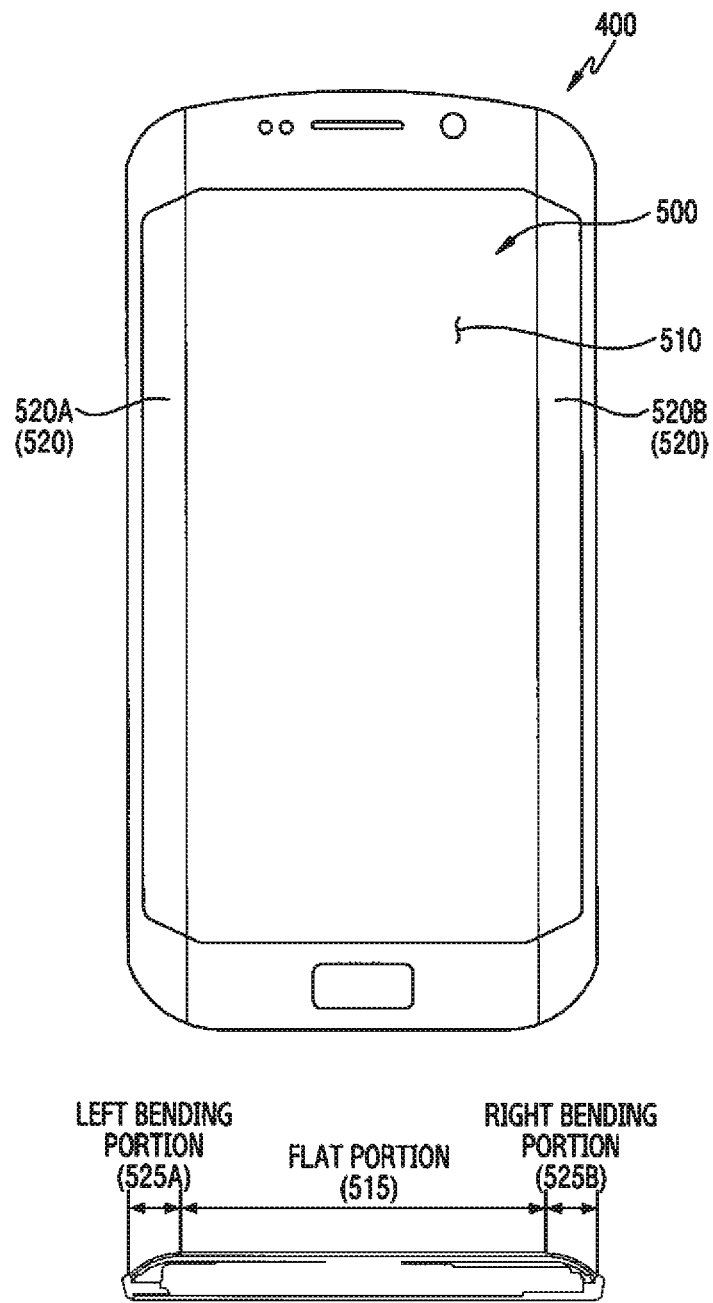
FIG. 5 illustrates an example of a display type of an electronic device according to various embodiments of the present disclosure.

FIG. 5 illustrates an example of a display type of an electronic device according to various embodiments of the present disclosure.

Referring to FIG. 5, a display 500 of the electronic device 400 according to various embodiments may include at least two or more regions. In various embodiments, the example of the display 500 including a main region (e.g., a flat display region) and sub regions 520, 520A, and 520B (e.g., curved display regions) on the left side of the main region 510 and the right side of the main region 510 is described for ease of explanations.

In various embodiments, the display 500 of the electronic device 400 may be functionally divided into two or more regions. For example, although the main region 510 and the sub region 520 are the single display panel, but functions of the corresponding regions may be separated. According to one embodiment, the main region 510 may be divided as a region for executing a general application (e.g., a message application, a schedule management application, an Internet application, a camera application, etc.), and the sub region 520 may be divided as a region for displaying a frequently used application, a notification application, or contents (e.g., images, icons, text, etc.).

In various embodiments, the region of the display 500 may be divided in various manners. For example, the display 500 may be divided into the main region and the sub region as mentioned above, a flat region and a curved region, a front region and a side region, a front region and a rear region, a visible region and an invisible region within a viewing angle, or regions which combine three or more of the above regions. Alternatively, the display 500 may be divided into a first region and a second region. Hereinafter, it is described by dividing a region which displays whole contents (or main contents, a main screen) of an application or contents as the main region (or the first region), and an extended region which provides additional information by relatively extending the main region 510 as the sub region (or the second region, an edge region, etc.). Such separation is provided for the sake of descriptions, and this separation is not intended to limit the embodiment of the invention.

In various embodiments, the term display may be understood as a concept including a display which supports a touch input function of various types such as an add-on type which combines a touch screen panel (TSP) on an LCD panel, an on-cell type which embeds the TSP in the LCD panel, and an in-cell type which embeds the touch function in the LCD panel.

In various embodiments, a touch event inputted on the display may be processed by a processor (e.g., the processor 120, 210). For example, the touch event may be inputted based on a capacitance change of the touch panel included the display 500, and may include a down event, an up event, a continued event, or a multi-touch event. The down event may indicate an event where the user presses the touch panel with an input device including a finger, a touch pen (an electronic pen), and so on. The up event may indicate an event where the user releases the input means from the touch panel after inputting the down event. The continued event may indicate an event inputted by the user by changing the position of the input device while keeping pressing on the touch panel after inputting the down event. The continued event may be represented as drag in the technical field to which the present disclosure pertains. The multi-touch event may indicate an event where the user inputs the down event at two or more points of the touch panel. In various embodiments, the touch event may occur owing to not only the direct touch input but also a proximity touch input for the display region.

In various embodiments, the electronic device 400 may be a multi-surface display device, having a plurality of display surfaces on the front. For example, the display 500 may include a first display disposed on a flat surface 515 of the front of the electronic device 400, a second display disposed in a left bending portion 525A of the front, and a third display disposed in a right bending portion 525B.

In various embodiments, the first display through the third display may face first through third directions respectively, and the first through third directions may differ from each other. In various embodiments, a region which displays an image (e.g., the main screen) on the first display may be defined as the main region, a region which displays an image (e.g., the sub screen, the extension screen) on the second display may be defined as a first sub region (e.g., a left sub region), and a region which displays an image (e.g., the sub screen, the extension screen) on the third display may be defined as a second sub region (e.g., a right sub region).

In various embodiments, the first display through the third display may be concatenated with each other. For example, the third display may be extended from the first display or the second display. Hence, at least part of the second sub region may be extended from a periphery of the main region, or a periphery of the first sub region. In various embodiments, at least one of the second display and the third display disposed in the left bending portion 525A and the right bending region 525B may include a curved display.

According to various embodiments, the first display through the third display may separately drive to display different images, or to display one image in a concatenated manner, under control of the processor. According to various embodiments, the processor may provide a user interface on the display 500 by executing an application, and control the screen displayed based one at least part of the first display through the third display in response to a user input. Hereafter, according to various embodiments, an example where the processor controls the screen displayed on the first display through the third display is explained, by referring to FIG. 5.

According to various embodiments, the first display, the second display, and the third display may display one concatenated screen in the respective display regions (e.g., the main region 510, the sub regions 520; 520A, 520B). That is, the first sub region 520A of the second display may display a screen (e.g., a left extension screen) concatenated with the left screen of the main region 510 of the first display, and the second sub region 520B of the third display may display a screen (e.g., a right extension screen) concatenated with the right screen of the main region 510 of the first display.

According to various embodiments, the first display and the third display may display one concatenated screen in the respective display regions (e.g., the main region 510, the second sub region 520B), and the second display may display a separate screen. For example, the second sub region 520B of the third display may display a screen (e.g., a right extension screen) concatenated with the right screen of the main region 510 of the first display, and the first sub region 520A of the second display may display a separate screen (e.g., the sub screen) divided from the left screen of the main region 510 of the first display.

According to various embodiments, the first display and the second display may display one concatenated screen in the respective display regions (e.g., the main region 510, the first sub region 520A), and the third display may display a separate screen. For example, the first sub region 520A of the second display may display a screen (e.g., the left extension screen) concatenated with the left screen of the main region 510 of the first display, and the second sub region 520B of the third display may display a separate screen (e.g., the sub screen) divided from the right screen of the main region 510 of the first display.

According to various embodiments, the first display, the second display, and the third display may display the separated screens in the respective display regions (e.g., the main region 510, the sub region 520). For example, the main region 510 of the first display may display a particular screen (e.g., a first screen), the first sub region 520A of the second display may display a separate screen (e.g., a second screen) divided from the left screen of the main region 510 of the first display, and the second sub region 520B of the third display may display a separate screen (e.g., a third screen) divided from the right screen of the main region 510 of the first display.

According to various embodiments, the display regions (e.g., the first sub region 520A, the second sub region 520B) of the second display and the third display may display different screens. According to various embodiments, at least one of the display regions (e.g., the first sub region 520A, the second sub region 520B) of the second display and the third display may operate in a turn-off state without displaying the screen according to the control of the processor or the type of the running application.

FIG. 6A, FIG. 6B, FIG. 6C and FIG. 6D are diagrams for illustrating examples of an electronic device according to various embodiments of the present disclosure.

FIG. 6A, FIG. 6B, FIG. 6C and FIG. 6D may depict the examples of the electronic device 400 having, for example, a curved display (or a bended display). In various embodiments, while the electronic device 400 is the electronic device having the curved display by way of example, it is not limited thereto. For example, in various embodiments, the electronic device 400 may include an electronic device having no bezel region or a quite narrow configuration, for example, an electronic device having a flexible display or a flat display.

Figure 6A:
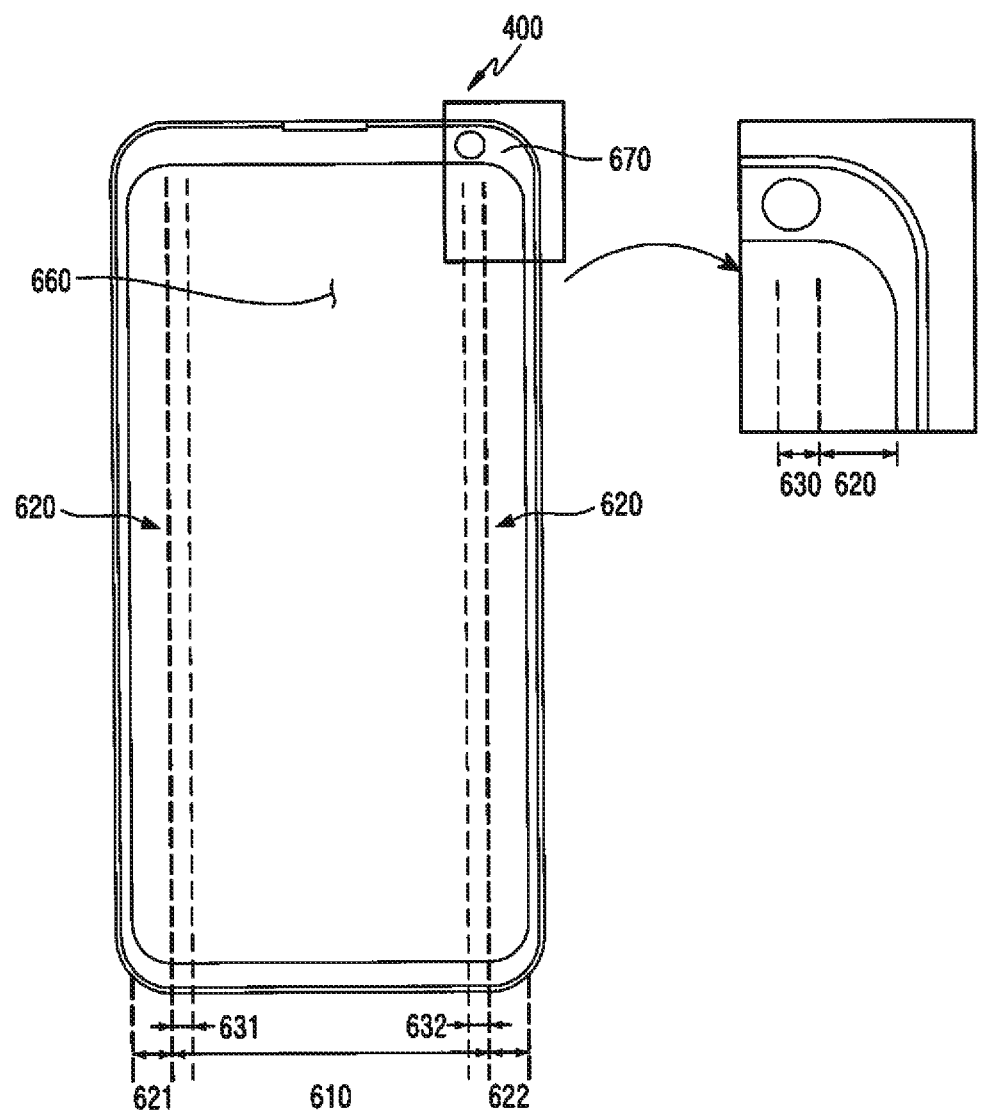
FIG. 6A, FIG. 6B, FIG. 6C and FIG. 6D illustrate examples of an electronic device according to various embodiments of the present disclosure.

Referring to FIG. 6A, according to various embodiments, a display 660 (e.g., the display 160 of FIG. 1, the display 260 of FIG. 2) of the electronic device 400 may be extended to at least one side (e.g., at least one surface of a left side, a right side, an upper side, and a lower side) of the electronic device 400, folded below the radius of curvature (e.g., the radius of curvature 5 cm, 1 cm, 7.5 mm, 5 mm, 4 mm, etc.) where the curved display may operate, and fastened to a side of a housing 670 (or a bezel). It is not limited thereto, and the display 660 according to various embodiments may be implemented in a right angle shape without the radius of curvature.

In various embodiments, a region appearing on the front of the curved display 660 may be referred to as a main region 610, and a region extending from the main region 610, bending to at least one side of the housing 670, and appearing on the side of the housing 670 may be referred to as a sub region 620 (e.g., a left sub region 621, a right sub region 622, an upper sub region 624 to be described, a lower sub region 623 to be described).

In various embodiments, the main region 610 and the sub region 620 are divided to ease the descriptions, and do not indicate the physically separated forms. According to various embodiments, the main region 610 and the sub region 620 may be implemented by one curved display 660 where at least one terminal end has a bended form, and the at least one terminal end bended extends to at least one side of the electronic device 400. According to various embodiments, the at least one terminal end bended may be implemented by extending to the back of the electronic device 400 according to the implementation type of the electronic device 400.

In various embodiments, the display 660 may support input and output, and process the input and the output by the main region 610 and the sub region 620 simultaneously or individually.

In various embodiments, at least part of the main region 610 may be set to an imitation region 630 (or an imitation information sensing region). For example, in various embodiments, the main region 610 of the electronic device 400 may allocate some region from a boundary of the sub region 620 and the main region 610 to the inside of the main region 610 as the imitation region 630. In various embodiments, the imitation region 630 may indicate a region displaying contents to copy in contents of the main screen displayed through the main region 610. For example, in various embodiments, whole or part of the contents of the main screen may be copied and thus the main screen may be extended and displayed through the sub region 620.

According to various embodiments, the main region 610 may set an outer partial region (e.g., the outer partial region (e.g., a left partial region 631, a right partial region 632) adjacent to the sub region 620 in the main region 610) of the main region 610 as the imitation region 630. According to various embodiments, the imitation region 630 is, for example, a region for acquiring imitation information based on at least part of a copy target in the main screen of the main region 610, and may be referred to as, for example, an imitation information sensing region. In various embodiments, the imitation region 630 may be configured by allocating a particular pixel (e.g., 1 pixel) from the boundary of the sub region 620 of at least one side of the main region 610. According to various embodiments, the imitation region 630 may be set to be greater (wider) or smaller (narrower) than the particular pixel, according to setting of the electronic device 400. An operating for displaying an extension screen based on the imitation information in the imitation region 630 according to various embodiments is described by referring to the drawings to be explained.

The electronic device 400 according to various embodiments, may divide and display the region displaying a related screen by executing a general application as the main region 610 (e.g., a first region), the region displaying a related screen such as notification contents, notification color or progress (e.g., alarm, player, etc.) or displaying the extension screen according to various embodiments as the sub region 620 (e.g., a second region), and some region of the main region 610 displaying the imitation information (e.g., a copy image, an imitation image) based on the contents of the main region 610 as the imitation region 630 on the display 660.

Figure 6B:
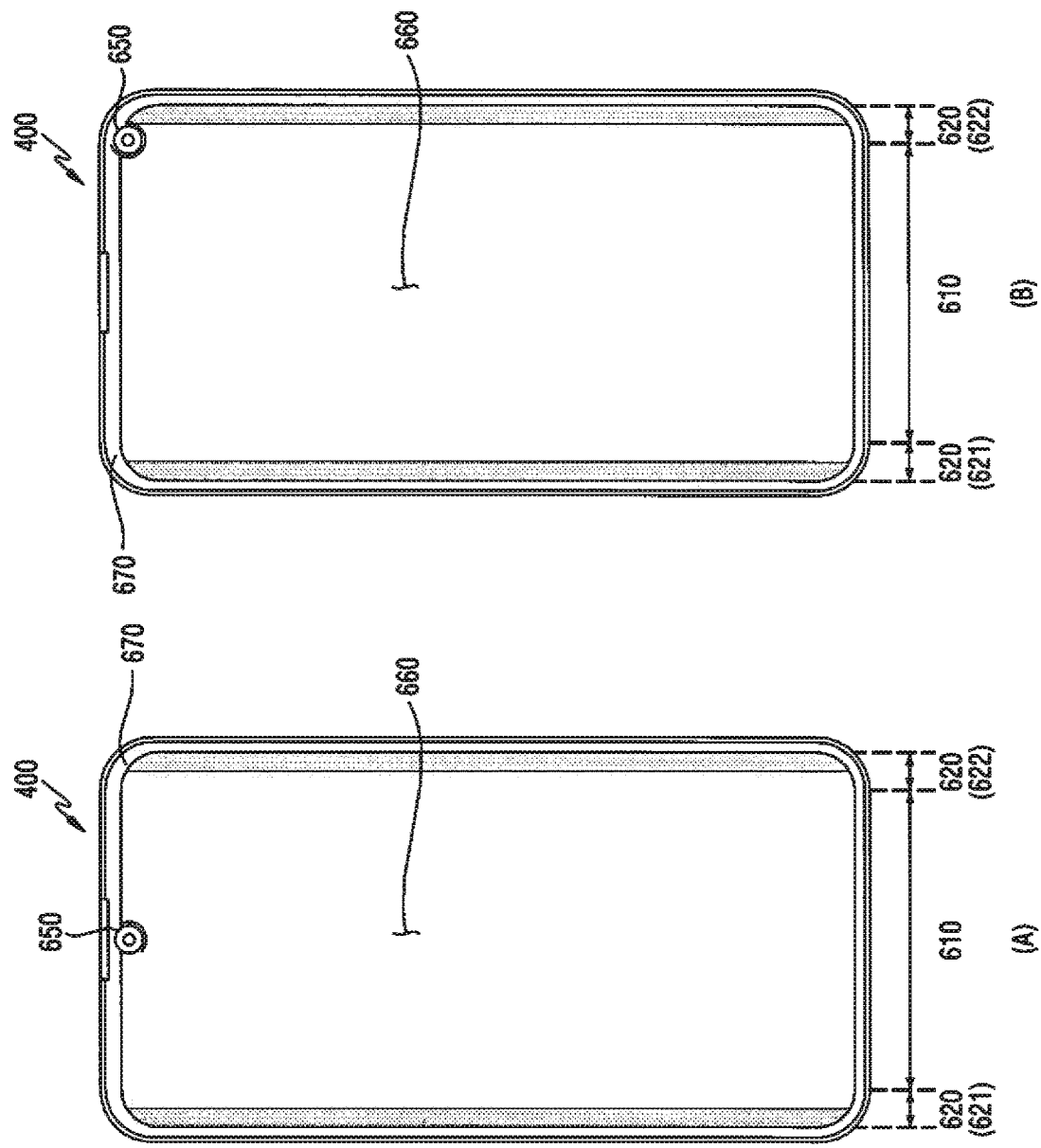
Figure 6C:
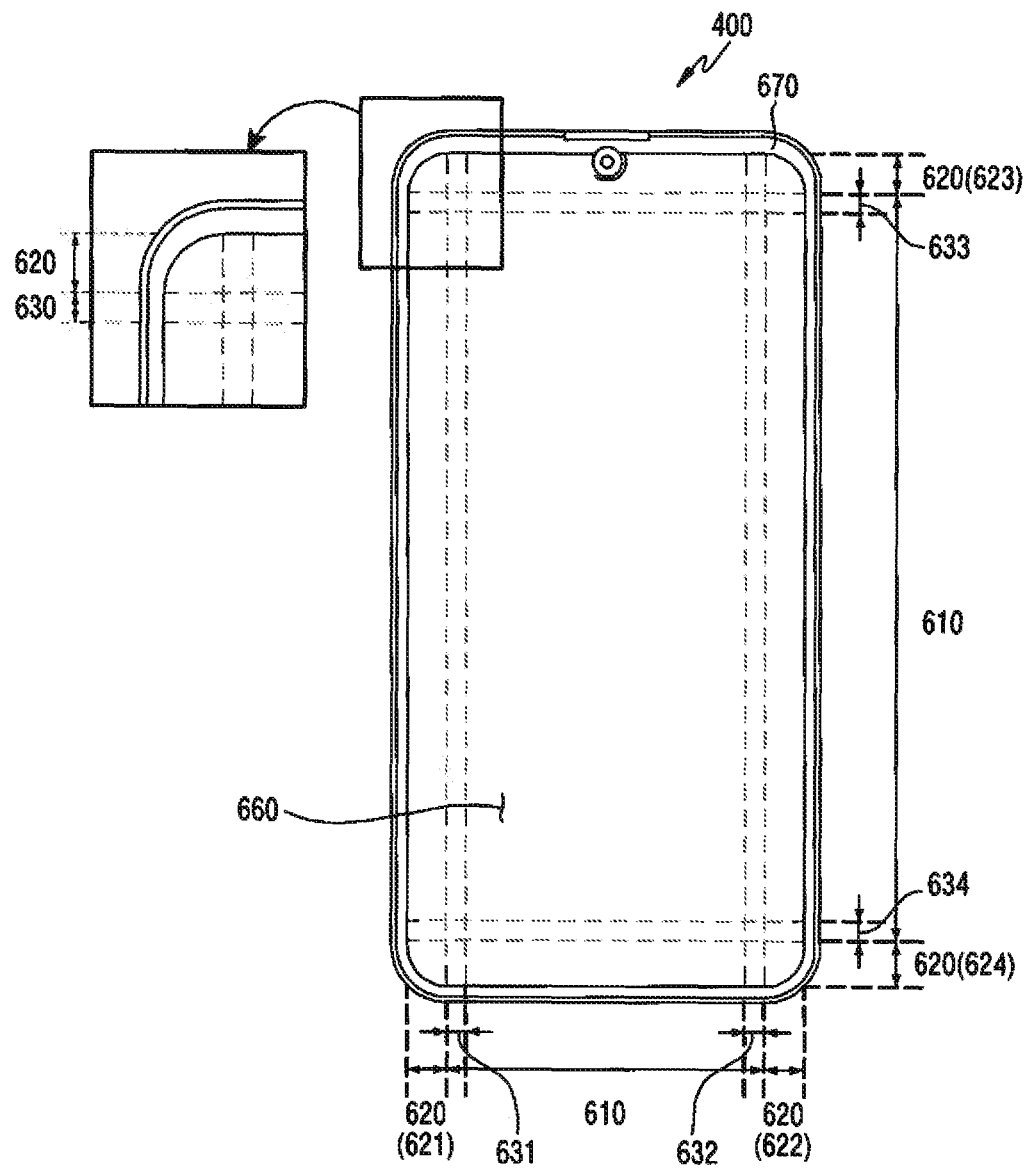
Figure 6D:
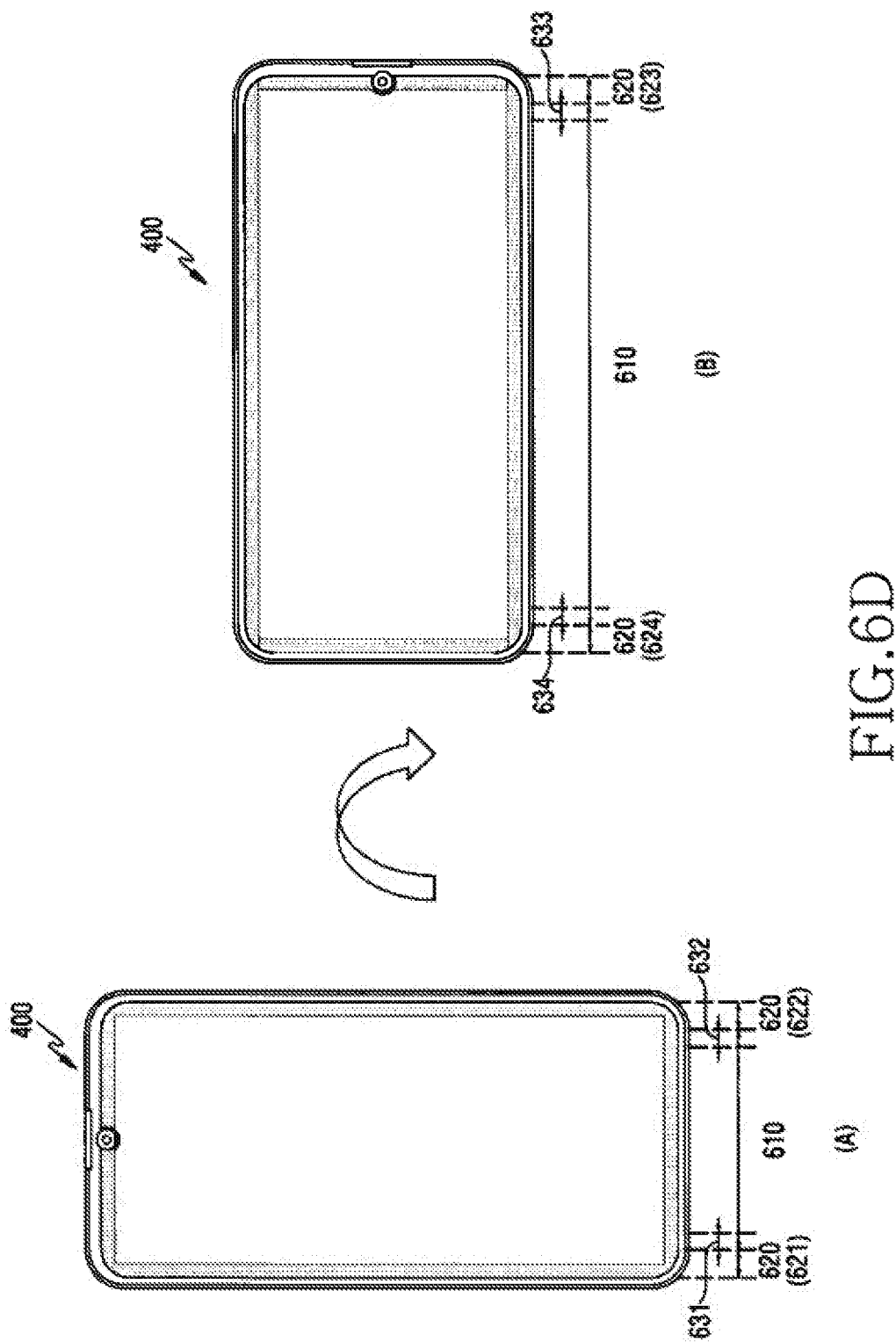

Referring to FIG. 6B, FIG. 6C and FIG. 6D, FIG. 6B, FIG. 6C and FIG. 6D may depict the examples of the electronic device 400 of different types having the curved display (or the flexible display). For example, the electronic device 400 of FIG. 6B, FIG. 6C and FIG. 6D may represent the example of the electronic device where the bezel region may be narrower than the electronic device 400 of FIG. 6A, and the front of the electronic device 400 is realized with the display 660. For example, the electronic device 400 of FIG. 6B, FIG. 6C and FIG. 6D may be an electronic device of a full front display type.

The electronic device 400 may include a camera 650 (e.g., a front camera) in the display 660 region. For example, the example <A> of FIG. 6B may depict the example where the camera 650 is disposed at the top center of the electronic device 400, and the example <B> of FIG. 6B may depict the example where the camera 650 is disposed at the top of the side portion (e.g., the upper right) of the electronic device 400. It is not limited thereto, and the electronic device 400 according to various embodiments may be realized by various displays, and the disposition of other device such as the front camera may be designed according to the display fastening structure.

As shown in FIG. 6B and FIG. 6C, as mentioned in the descriptions of FIG. 6A as above, the electronic device 400 may include the main region 610 and the sub region 620 (or an edge region) (e.g., the left sub region 621, the right sub region 622, the upper sub region 623, the lower sub region 624) which extends from the main region 610, bends to at least one side (e.g., the left side, the right side, the upper side, the lower side) of the housing (or the bezel) 670, and appears on the side of the housing 670. In various embodiments, the main region 610 and the sub region 620 are divided for ease of description, and do not mean the physically separated forms.

In various embodiments, FIG. 6B may depict the example where the display 660 of the electronic device 400 is extended to the left side and the right side of the electronic device 400, and fastened to the side (e.g., both sides) of the housing 670 (or the bezel). For example, it may depict the example where the sub region 620 (e.g., the left sub region 621, the right sub region 622) is configured on either side from the main region 610. According to various embodiments, the main region 610 may include an imitation region based on at least part of the left or right edge portion of the main region 610, as aforementioned in the example of FIG. 6A.

In various embodiments, FIG. 6C may depict the example where the display 660 of the electronic device 400 is extended to the left side, the right side, the upper side, or the lower side of the electronic device 400, and is fastened to at least part of the side (e.g., the upper, lower, left, and right sides) of the housing 670 (or the bezel). For example, it may depict the example where the sub region 620 (e.g., the left sub region 621, the right sub region 622) is configured on the left and right sides from the main region 610, and the sub region 620 (e.g., the upper sub region 623, the lower sub region 624) is configured on the upper and lower sides. In various embodiments, one or more sub regions 620 (e.g., 621, 622, 623, and 624) may be configured by extending to at least one side (e.g., at least one surface of the left side, the right side, the upper side, or the lower side) according to the implementation type of the display 660 of the electronic device 400. According to various embodiments, the main region 610 may include, as in the example of FIG. 6A as described above, the imitation region (e.g., 630, 631, 632, 633, and 634) based at least in part on the edge portion of the left side, the right side, the upper side, or the lower side of the main region 610.

In various embodiments, the main region 610 of the electronic device 400 may allocate some inward region of the main region 610 from the boundary of each sub region 620; 621, 622, 623, and 624 of the left side, the right side, the upper side, and the lower side and the main region 610 as the imitation region 630. For example, in the example of FIG. 6C, the main region 610 may include four imitation regions 630; 631, 632, 633, and 634 based on the left side, the right side, the upper side, and the lower side. According to various embodiments, the main region 610 may set an outward partial region (e.g., the outward partial region (e.g., a left partial region 631, a right partial region 632, an upper partial region 633, a lower partial region 634) adjacent to the sub region 620 in the main region 610) of the main region 610 as the imitation region 630. According to various embodiments, the imitation region 630 is, for example, the region for acquiring imitation information in the main screen of the main region 610, and may be configured by allocating a particular pixel (e.g., 1 pixel) from the boundary of the sub region 620 of at least one side of the main region 610. An operation for displaying based on the imitation information (e.g., an imitation image) in the imitation region 630 according to various embodiments is described in detail by referring to the drawings to be explained.

In various embodiments, the electronic device of the full front display type as in the example of FIG. 6B may use the extension screen with the resolution, for example, 18.5:10, 18.5:11, 18.5:9, 16:10, 16:11, through the whole display region (e.g., the main region 610 and the sub region 620) by default, or may use the general screen such as normal resolution 16:9 only through the main region 610.

As shown in FIG. 6D, the electronic device 400 may divide and operate the first sub region 620 (e.g., 621, 622) and the second sub region 620 (e.g., 623, 624), according to an operation mode (e.g., a landscape mode or a portrait mode) of the electronic device 400. For example, the electronic device 400 of FIG. 6C and FIG. 6D may be an electronic device having upper, lower, left, and right flexible displays, and may be an electronic device with no or narrower bezel, by configuring an additional or extension display (e.g., the sub region 620) on all of the upper, lower, left, and right sides. In various embodiments, if operating in the portrait mode, the electronic device 400 may process displaying of the screen extension based on the first sub region 420 (e.g., 621, 622) and, if operating in the landscape mode, the electronic device 400 may process the displaying of the screen extension based on the second sub region 620 (e.g., 623, 624). For example, a hand shape of the user gripping the electronic device 400 may differ according to the operation mode of the electronic device 400, and activation/deactivation of the sub region 620 may be realized depending on the operation mode of the electronic device 400.

According to various embodiments, the setting of the imitation region 630 may also change, in response to the switch of the sub region 620 according to the operation mode change of the electronic device 400. According to one embodiment, if operating in the portrait mode as shown in the example <A> of FIG. 6D, the electronic device 400 may process the displaying of the screen extension based on the first sub region 420 (e.g., 621, 622), and the extension screen may be configured based on imitation information acquired by the first imitation region 630 (e.g., 631, 632). According to one embodiment, if operating in the landscape mode as shown in the example <B> of FIG. 6D, the electronic device 400 may process the displaying of the screen extension based on the second sub region 620 (e.g., 623, 624), and the extension screen may be configured based on imitation information acquired by the second imitation region 630 (e.g., 633, 634).

Figure 7:
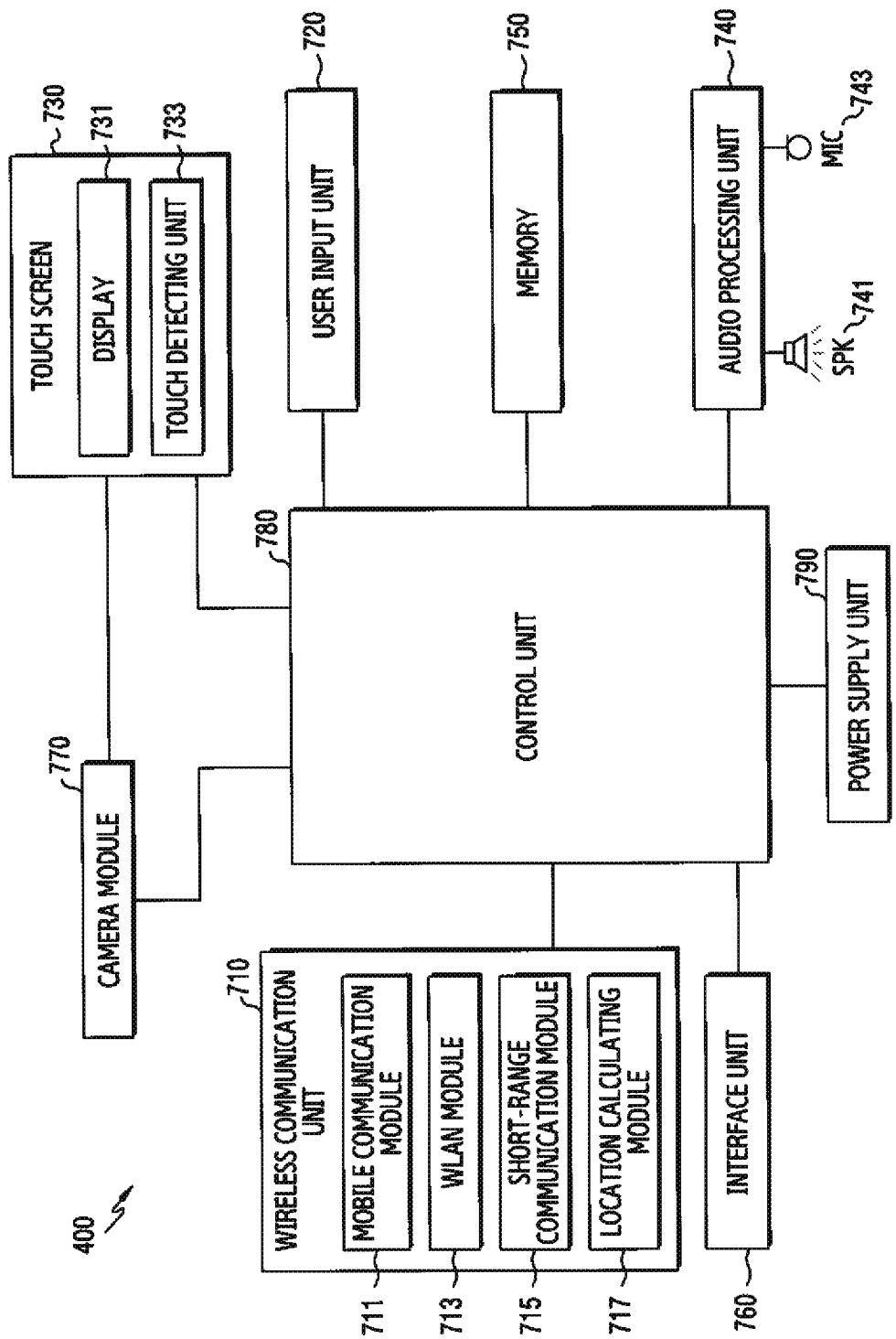
FIG. 7 schematically illustrates a configuration of an electronic device according to various embodiments of the present disclosure.

FIG. 7 schematically illustrates a configuration of an electronic device according to various embodiments of the present disclosure.

Referring to FIG. 7, an electronic device 400 according to various embodiments may include, for example, a wireless communication unit 710, a user input unit 720, a touch screen 730, an audio processing unit 740, a memory 750, an interface unit 760, a camera module 770, a control unit 780 (e.g., one or more processors (e.g., the processor 120, the processor 210) including processing circuitry), and a power supply unit 790. In various embodiments, the electronic device 400 does not necessarily include the components of FIG. 7, and may be implemented to include more components than the components of FIG. 7 or include less components.

The wireless communication unit 710 may have, for example, the same or similar configuration to the communication module 220 of FIG. 2. The wireless communication unit 710 may include one or more modules enabling wireless communications between the electronic device 400 and an external device (e.g., other electronic device 102 and 104, the server 106). For example, the wireless communication unit 710 may be configured by including a mobile communication module 711, a wireless LAN (WLAN) module 713, a short range communication module 715, a location calculating module 717, and so on. In various embodiments, the wireless communication unit 710 may include a module (e.g., a short range communication module, a telecommunications module, etc.) for communicating with an external device in vicinity.

The mobile communication module 711 may have the configuration identical or similar to, for example, the cellular module 221 of FIG. 2. The mobile communication module 711 may transmit and receive radio signals to and from a base station, the external device (e.g., the other electronic device 104), and at least one of various servers on a mobile communication network. The radio signals may include a voice signal, a data signal, or various control signals. The mobile communication module 711 may transmit various data required for operations of the electronic device 400, to the external device (e.g., the server 106 or the other electronic device 104) in response to a user request.

The WLAN module 713 may have the configuration identical or similar to, for example, the WiFi module 223 of FIG. 2. The WLAN module 713 may indicate a module for establishing a wireless Internet access and a WLAN link with the external device (e.g., the other electronic device 102 or the server 106). The WLAN module 713 may be embedded in or mounted outside the electronic device 400. The wireless Internet technique may use, for example, WiFi, Wibro, world interoperability for microwave access (WiMax), high speed downlink packet access (HSDPA), or millimeter wave (mmWave). In association with the external device (e.g., the other electronic device 104) connected with the electronic device 400 over the network (e.g., the wireless Internet network) (e.g., the network 162 of FIG. 1), the WLAN module 713 may transmit various data of the electronic device 400 to outside, or receive from the outside. The WLAN module 713 may keep turning on all the time, or may turn on/turn off according to the setting of the electronic device 400 or a user input.

The short range communication module 715 may indicate a module for performing short range communication. The short range communication may use, for example, Bluetooth, Bluetooth low energy (BLE), radio frequency identification (RFID), infrared data association (IrDA), ultra wideband (UWB), Zigbee, or near field communication (NFC). In association with the other device (e.g., the other electronic device 102, etc.) connected with the electronic device 400 over the network (e.g., a short range communication network), the short range communication module 715 may transmit or receive various data of the electronic device 400 to or from the external device. The short range communication module 415 may keep turning on all the time, or may turn on/turn off according to the setting of the electronic device 400 or a user input.

The location calculating module 717 may have the configuration identical or similar to, for example, the GNSS module 227 of FIG. 2. The location calculating module 717 is a module for acquiring a location of the electronic device 400, and may include a global position system (GPS) module as an example. The location calculating module 717 may measure the location of the electronic device 400 using triangulation.

The user input unit 720 may generate input data for controlling the operation of the electronic device 400 in response to a user input. The user input unit 720 may include at least one input device for detecting user's various inputs. For example, the user input unit 720 may include a key pad, a dome switch, a physical button, a touch pad (resistive/capacitive), a jog & shuttle, and a sensor (e.g., the sensor module 240 of FIG. 2).

Part of the user input unit 720 may be implemented as a button outside the electronic device 400, and part or whole may be implemented as a touch panel. The user input unit 720 may receive a user input for initiating various operations (e.g., screen extension function, application execution function, shooting function, data generating function, data reproducing function, etc.) of the electronic device 400, and generate an input signal according to the user input.

The touch screen 730 may indicate an input/output device which may execute the input function and the displaying function at the same time. According to various embodiments, the touch screen 730 may include a display 731 (e.g., the display 160 or 260 of FIG. 1 or FIG. 2) and a touch detecting unit 733. The touch screen 730 may provide an input/output interface between the electronic device 400 and the user. For example, the touch screen 730 may include an intermediary role for forwarding a user's touch input to the electronic device 400, and showing an output from the electronic device 400 to the user. The touch screen 730 may display a visual output to the user. The visual output may be presented with text, graphic, video, and their combination.

The display 731 may display (output) various information processed in the electronic device 400. For example, the display 731 may display various user interfaces (UIs) or graphical UIs (GUIs) relating to using the electronic device 400. According to various embodiments, the display 731 may provide various screen configurations according to operating the main region and the sub region. The display 731 may use various displays (e.g., the display 160 of FIG. 1). In various embodiments, the display 731 may use a curved display.

According to various embodiments, the display 731 may include a display control circuit (e.g., a DDI) (not shown) which provides an electric signal (e.g., an MHVL signal) to a display panel (not shown). In various embodiments, the display control circuit may be a key component required for driving the display 731. In various embodiments, the display control circuit may indicate a circuit for driving the display, as the IC for providing a driving signal and data as the electrical signal (e.g., the MHVL signal) to the display 731 to display an image (e.g., text, a picture, a still image, a moving image, etc.) on the screen. According to various embodiments, the display control circuit may be referred to as an extension screen module, and may be implemented in software and: or hardware. For example, in various embodiments, the display control circuit may be referred to as a software DDI and/or a hardware DDI, and process an operating relating to the displaying using the sub region of the display 731.

The touch detecting unit 733 may be received in the display 731, and detect a user input for contacting or approaching a surface of the touch screen 730. The user input may include a touch event or a proximity event inputted based on at least one of single-touch, multi-touch, hovering, or air gesture. The touch detecting unit 733 in various embodiments may receive the user input for initiating various operations to use the electronic device 400, and generate an input signal according to the user input.

The audio processing unit 740 may have the configuration identical or similar to, for example, the audio module 280 of FIG. 2. The audio processing unit 740 may transfer an audio signal inputted from the control unit 780 to a speaker (SPK) 741, and forward an audio signal such as a voice inputted from a microphone (MIC) 743 to the control unit 780. The audio processing unit 740 may convert and output voice/sound data as an audible sound through the speaker 741 under control of the control unit 780, and convert an audio signal such as a voice received from the microphone 743 to a digital signal and forward to the control unit 780.

The speaker 741 may output audio data received from the wireless communication interface 710, or stored in the memory 750. The speaker 741 may output sound signals relating to various operations (functions) in the electronic device 400.

The microphone 743 may receive and process an external sound signal as electric voice data. Various noise reduction algorithms may be realized in the microphone 743 to reduce noise occurring if the received external sound signal is inputted. The microphone 743 may receive an audio stream such as a voice command (e.g., a voice command for activating/deactivating the screen extension function).

The memory 750 (e.g., the memory 130 or 230 of FIG. 1 or FIG. 2) may perform functions for storing one or more programs executed by the control unit 780, and temporarily storing (e.g., buffering) the inputted/outputted data. The inputted/outputted data may include, for example, videos, images, photos, audio, and so on. The memory 750 may store the obtained data, the data obtained in real time may be stored in a temporary storage device (e.g., a buffer), and data to store may be stored in a storage device allowing long-term storage.

The memory 750 may store one or more programs and data for executing the function for displaying the screen by dividing the main region and the sub region of the display 731 of the electronic device 400, and the function for displaying the extension screen based on the imitation information sensed (obtained) through the imitation region. According to various embodiments, the memory 750 may store one or more programs, data or instructions for causing the control unit 780 (e.g., the processor) to sense at least part of the main region, to generate the imitation information for the extension screen based on the sensed region, and to display the extension screen in the sub region in connection with the main screen of the main region based on the imitation information. According to various embodiments, the memory 750 may store one or more programs, data or instructions for causing the control unit 780 to generate a first canvas for drawing the extension screen displayed in the sub region, to generate a second canvas for drawing the main screen displayed in the main region, to calculate a size and a position of a view of the main screen, to obtain imitation information according to the view, to draw the view on the second canvas, to draw the imitation information on the first canvas, to draw the first canvas and the second canvas in the memory, and to display the first canvas in the sub region at displaying the second canvas in the main region.

The memory 750 may include an extended memory (e.g., the external memory 234 of FIG. 2) or an internal memory (e.g., the internal memory 232 of FIG. 2). The electronic device 400 may operate in association with a web storage which performs a storage function of the memory 750 on the Internet.

The memory 750 may store one or more software (or software modules). For example, software components may include an OS software module, a communication software module, a graphic software module, a user interface software module, a MPEG module, a camera software module, and one or more application software modules. Also, the module which is the software component may be represented as a set of instructions and accordingly may be referred to as an instruction set. The module may be referred to as a program. In various embodiments, the memory 230 may include an additional module (instructions) in addition to the above-stated module. Alternatively, if necessary, some module (instructions) may not be used.

The OS software module may include various software components for controlling general system operations. The general system operation control may indicate, for example, memory management and control, storage hardware (device) control and management, or power control and management. In addition, the OS software module may also facilitate communications between various hardware (devices) and software components (modules).

The communication software module may enable communication with other electronic device such as a wearable device, a smart phone, a computer, a server, a television, a monitor or a portable terminal through the communication module (e.g., the wireless communication unit 710, the communication module 220) or an interface (e.g., the interface unit 760, the interface 270). The communication software module may be configured in a protocol structure corresponding to a corresponding communication method.

The graphic software module may include various software components for providing and displaying graphics on the display (e.g., the display 731, the display 260). In various embodiments, the term graphics may be used to encompass text, a webpage, an icon, a digital image, a video, and an animation.

The user interface software module may include various software components relating to the UI. For example, it may include contents regarding how a status of the user interface changes and in which condition the user interface status changes.

The MPEG module may include a software component enabling digital content (e.g., video, audio) related processes and functions (e.g., content creation, reproduction, distribution, and transmission).

The camera software module may include a camera related software component allowing camera related processes and functions.

The application module may include a web browser including a rendering engine, email, instant message, word processing, keyboard emulation, address book, touch list, widget, digital right management (DRM), iris scan, fingerprint scan, context cognition, voice recognition, position determining function, location based service, and so on.

The memory 750 may include a computer readable recording medium which records a program for executing the method according to various embodiments at the processor (e.g., the control unit 780).

According to various embodiments, the computer readable recording medium may include, for example, a computer readable recording medium which records a program for, if displaying the screen on the display 731, sensing at least part of the main region divided on the display 731, generating imitation information for the extension screen based on the sensed region, and displaying the extension screen in the sub region divided on the display 731 in connection with the main screen of the main region based on the imitation information.

The interface unit 760 may the configuration identical to or similar to, for example, the interface 270 of FIG. 2. The interface unit 760 may receive data or power from other electronic device and forward it to the components of the electronic device 400. The interface unit 760 may transmit data from the electronic device 400 to the other electronic device. For example, the interface 760 may include a wired/wireless headphone port, an external charger port, a wired/wireless data port, a memory card port, an audio input/output port, a video input/output port, an earphone port, and so on.

The camera module 770 (e.g., the camera module 291 of FIG. 2) indicates a configuration for supporting the shooting function of the electronic device 400. The camera module 770 may capture any object under control of the control unit 780, and transfer the captured data (e.g., an image) to the display 731 and the control unit 780.

According to various embodiments, the camera module 770 may include, for example, a first camera (e.g., a color (RGB) camera) for acquiring color information, and a second camera (e.g., an IR camera) for acquiring depth information (e.g., position information, distance information of a subject). The camera module 770 may include an image sensor. The image sensor may be implemented with a charged coupled device (CCD) or a complementary metal-oxide semiconductor (CMOS). According to one embodiment, the first camera may be a front camera disposed on the front of the electronic device 400. According to various embodiments, the front camera may be replaced by the second camera, and may not be disposed on the front of the electronic device 400. According to various embodiments, the first camera may be disposed on the front of the electronic device 400 together with the second camera. According to one embodiment, the first camera may be a rear camera disposed on the back of the electronic device 400. According to one embodiment, the first camera may be of a type including both of the front camera and the rear camera disposed on the front and the back respectively of the electronic device 400.

The control unit 780 (e.g., the processor, the control circuit) may control overall operation of the electronic device 400. The control unit 780 in various embodiments may have the configuration identical or similar to, for example, the processor 210 of FIG. 2.

According to various embodiments, the control unit 780 may process operations for, if displaying the screen on the display 731, sensing at least part of the main region divided on the display 731, generating the imitation information for the extension screen based on the sensed region, and displaying the extension screen in the sub region divided on the display 731 in connection with the main screen of the main region based on the imitation information. According to various embodiments, the control unit 780 may process operations for generating a first canvas for drawing the extension screen displayed in the sub region, generating a second canvas for drawing the main screen displayed in the main region, calculating a size and a position of a view of the main screen, obtaining imitation information according to the view, drawing the view on the second canvas, drawing the imitation information on the first canvas, drawing the first canvas and the second canvas in the memory, and displaying the first canvas in the sub region at displaying the second canvas in the main region.

The control unit 780 may include one or more processors for controlling the operation of the electronic device 400. For example, the control unit 780 may include a CP, an AP, an interface (e.g., general purpose input/output (GPIO)), or an internal memory, as separate components, or may integrate them on one or more integrated circuits. According to one embodiment, the AP may conduct various functions for the electronic device 400 by executing various software programs, and the CP may process and control voice communication and data communication. The control unit 780 may execute a particular software module (an instruction set) stored in the memory 750 and thus carry out various specific functions corresponding to the module.

The control unit 780 in various embodiments may control the operation of the hardware module such as the audio processing unit 740, the interface unit 760, the display 731, the camera module 770. The control (or processing) operation of the control unit 780 according to various embodiments of the present disclosure is described in detail by referring the drawings to be explained. According to various embodiments of the present disclosure, the control unit 780 may be implemented with one or more processors which control the operations of the electronic device 400 according to various embodiments of the present disclosure by executing one or more programs stored in the memory 750. According to various embodiments, the control unit 780 may be electrically or functionally coupled with the display 731 and the memory 750 of the electronic device 400.

The power supply unit 790 may receive external power or internal power and supply the power required to operate the components under control of the control unit 780. In various embodiments, the power supply unit 790 may supply or cut (on/off) the power to the wireless communication unit 710, the display 731 and the camera module 770 under the control of the control unit 780. According to various embodiments, the power supply unit 790 may include, for example, a battery control circuit. For example, the power supply unit 790 may be configured by including a battery (e.g., a rechargeable battery and/or a solar battery), a remaining battery level measuring circuit (e.g., a fuel gauge), a power management integrated circuit (PMIC), a charger circuit, a booster circuit (e.g., a booster circuit), and so on.

Figure 8:
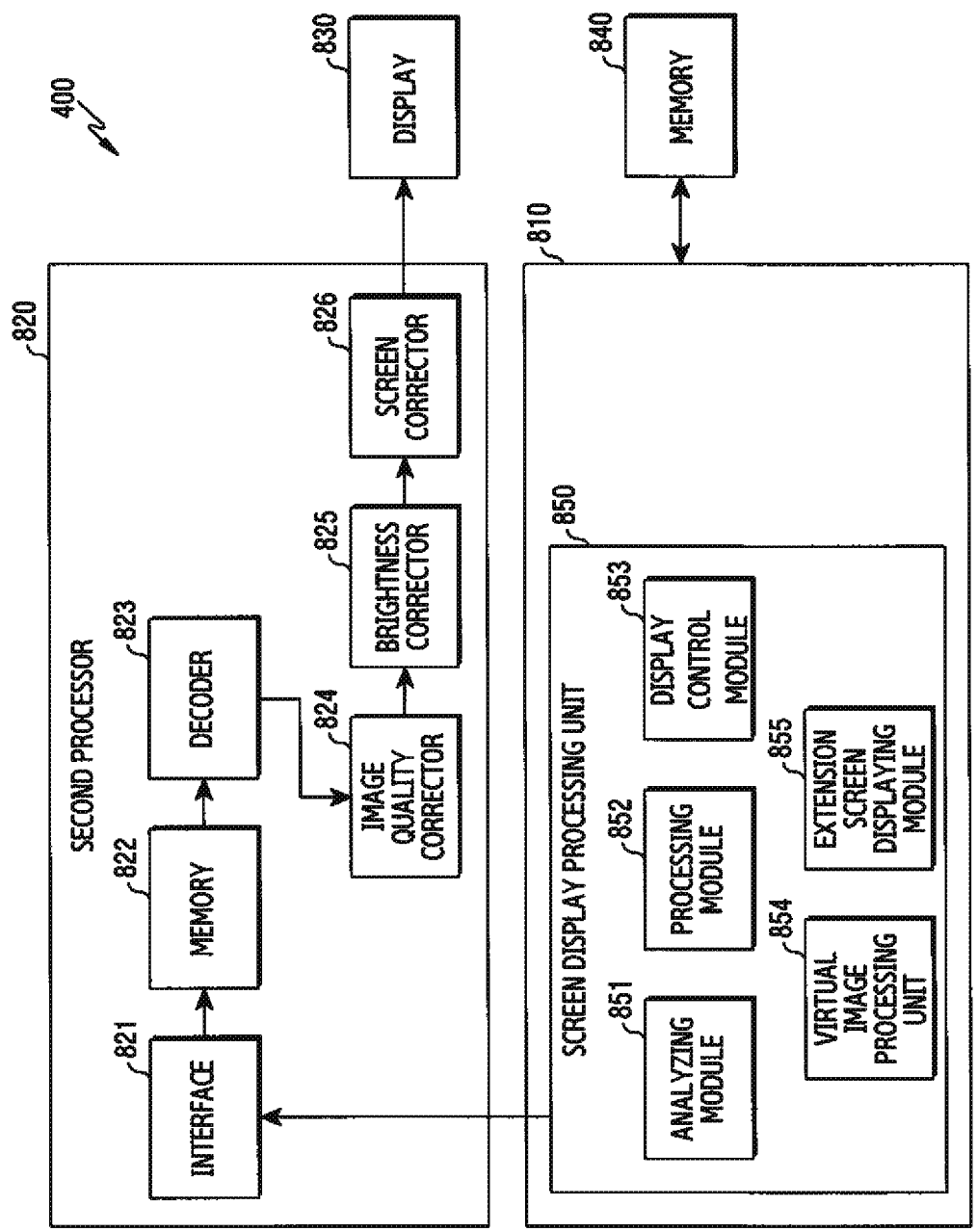
FIG. 8 schematically illustrates a configuration of an electronic device for processing displaying of a display in the electronic device according to various embodiments of the present disclosure.
Figure 9:
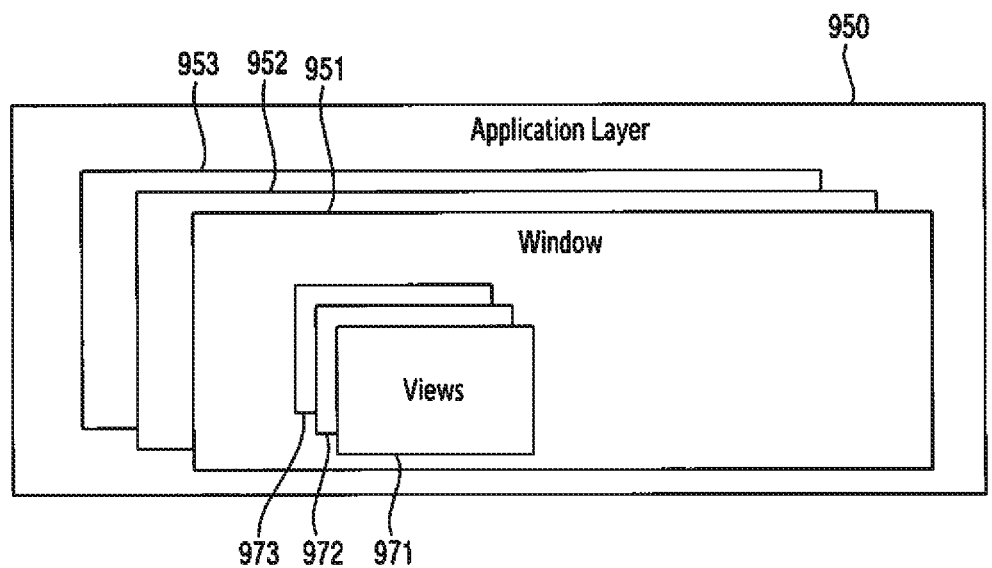
FIG. 9 illustrates an example of a layer structure of an application layer in an electronic device according to various embodiments.

FIG. 8 schematically illustrates a configuration of an electronic device for processing displaying of a display in the electronic device according to various embodiments of the present disclosure. FIG. 9 illustrates an example of a layer structure of an application layer in an electronic device according to various embodiments.

Hereafter, referring to FIG. 8, the operation example for dividing and processing image processing for a main region and at least one sub region of a display 830, through a first processor 810 and a second processor 820, in the electronic device 400 according to various embodiments is explained.

Referring to FIG. 8, the electronic device 400 according to various embodiments may include the first processor 810, the second processor 820, the display 830, and a memory 840.

In various embodiments, the display 830 may include the main region which is exposed in one surface of a housing (e.g., the housing 450 of FIG. 4) of the electronic device 400 and is flat, and the sub region which is extended with at least part bending from the main region. In various embodiments, the display 830 may display the screen by dividing into the main region and the sub region. In various embodiments, the sub region may use an edge portion of a curved display, a folding surface in a flexible display, or a region divided on a flat display.

In various embodiments, the first processor 810 may have the configuration identical or similar to the processor 210 of FIG. 2 or the control unit 780 of FIG. 7. For example, the first processor 810 may be implemented with an AP.

In various embodiments, the first processor 210 may process to display the screen in the main region of the display 830, or in the main region and the sub region of the display 830 in response to setting of the electronic device 400. According to one embodiment, the first processor 810 may determine a display mode of the display 830 based on user's use setting (e.g., whether to use at least one sub region of the display 830) of the display 830. The first processor 810 may perform the image processing for the displaying corresponding to the main region if determining to use the main region, and generate corresponding control information. The first processor 810 may perform the image processing for the displaying corresponding to the main region and the sub region if determining to use the main region and the sub region, and generate corresponding control information.

In various embodiments, the first processor 810 may set an imitation region in the main region of the display 830 in response to the setting of the electronic device 400, and process to display the main screen of the main region at an extension screen through the sub region based on the imitation information obtained through the imitation region. According to one embodiment, the first processor 810 may determine the display mode (e.g., whether to extend the screen) of the display 830 based on screen extension function setting. According to one embodiment, the first processor 810 may determine the display mode (e.g., whether to extend the screen) of the display 830 based on a state (e.g., a lying state, a grip state) of the electronic device 400. If determining to use the screen extension function, the first processor 810 may acquire the imitation information (e.g., contents of the imitation region in the main screen) based on the imitation region (e.g., the imitation information sensing region) of the main region, perform the image processing to display the extension screen based on the acquired imitation information, and generate corresponding control information.

According to various embodiments, the first processor 810 may forward the processed image and control information to the second processor 820. In various embodiments, the first processor 810 may further include a screen display processing unit 850 which determines and processes whether to display the main region, or whether to display the main region and the sub region, or determines and processes whether to display by the screen extension function using the imitation region. According to various embodiments, whole or part of the screen display processing unit 850 may be implemented in software.

In various embodiments, the screen display processing unit 850 (e.g., the first processor 810) may include a module for processing various operations relating to displaying a virtual image and/or an imitation image in the sub region. For example, the screen display processing unit 850 may be implemented by including an analyzing module 850, a processing module 852, a display control module 853, a virtual image processing module 854, and an extension screen displaying module 855.

According to various embodiments, the screen display processing unit 850 (or the first processor 810) may process an operation for displaying the extension screen (e.g., the imitation image) based on the imitation information, and an operation for displaying the virtual image of the sub region together with the extension screen (e.g., the imitation image) in various embodiments.

According to various embodiments, the analyzing module 851 may include a module for analyzing contents (or the main screen) of the main region. For example, the analyzing module 851 may obtain a layer structure of the contents displayed in the main region, and thus extract feature information of a view of the displayed main contents. The analyzing module 851 may analyze the contents based on the feature information, and provide the analyzed contents as analysis information to the processing module 852. The analysis information may include, for example, information for determining an appropriate correction scheme for the extension screen display. An example of the layer structure (e.g., an application layer) according to various embodiments is shown in FIG. 9.

As shown in FIG. 9, FIG. 9 is the diagram for illustrating the layer structure of the view, as the block example of an application layer 950. For example, FIG. 9 may depict the example of a component (e.g., a window, a view) of each application of the application layer 950. Referring to FIG. 9, the application may be provided through a plurality of windows 951, 952, and 953. The windows 951, 952, and 953 may be overlapping according to Z-order. The windows 951, 952, and 953 each may include one or more views 971, 972, and 973.

According to various embodiments, the processing module 852 may include a module for processing as information for displaying the extension screen in the sub region based on the contents (the analysis information) analyzed by the analyzing module 851. For example, the processing module 852 may indicate the module which modulates the contents of the main region based on the analysis information provided by the analyzing module 851. According to one embodiment, the processing module 852 may extract information for extending and displaying the whole layer of the main region or background information of the layer of the main region and provide it as the processing information for the extension screen using the sub region. According to various embodiments, the processing module 852 may sense (acquire) imitation information based on the set imitation region, in the main region providing at least one view determined based on the analysis information, and provide the processing information (e.g., the imitation image) for the extension screen through the sub region based on the imitation information.

According to various embodiments, the display control module 853 may include a module for performing the image processing to display the extension screen in the sub region based on the processing information (e.g., the imitation image) processed by the processing module 852. Based at least in part on the analysis information and the processing information, the display control module 853 may control to display the extension screen in the sub region in software or in hardware. According to one embodiment, the display control module 853 may control to display the extension screen by the software DDI or the hardware DDI. The display control module 853 may control the operation of the software DDI (e.g., the extension screen displaying module 855) if determining to display the extension screen in software, and may control the operation of the hardware DDI (e.g., the second processor 820 (e.g., the display control circuit)) if determining to display the extension screen in hardware. According to various embodiments, the display control module 853 may provide an effect for reducing difference between the main screen of the main region and the extension screen of the sub region, and/or between the sub screen of the sub region and the extension screen and continuously display it.

According to various embodiments, if the sub region is used by the user, the virtual image displaying unit 854 may control to naturally present a relevant sub screen (e.g., a virtual image) (e.g., notification contents, notification color, progress, etc.) through, for example, a user input (e.g., a touch) to the sub region.

According to various embodiments, the extension screen displaying module 855 may include, for example, a software DDI, and may perform software image processing to display the sub region. According to various embodiments, the extension screen displaying module 855 may execute, for example, a function corresponding to the second processor 820 in software.

In various embodiments, the second processor 820 may be implemented with, for example, a DDI. In various embodiments, the second processor 820 may receive the image and the control information for the display processing from the first processor 810. The second processor 820 may determine the display mode based on the received control information.

According to various embodiments, if determining to display the main region and the sub region of the display 830 based on the control information, the second processor 820 may forward the received image to the display 830 as it is.

According to various embodiments, if determining the displaying by the sub region (e.g., independent displaying of the sub region, the extension (expansion) screen displaying of the main region, etc.) of the display 830 based on the control information, the second processor 820 may generate a virtual image by specific processing (e.g., pixel extension, gradation, black, or blur processing) for the sub region based on the control information. The second processor 820 may forward the image (e.g., the main screen) for the main region received from the first processor 810, the specifically processed virtual image and/or the specifically processed imitation image to the display 830.

In various embodiments, the second processor 820 may be implemented by including an interface 821, a memory 822, a decoder 823, an image quality corrector 824, a brightness corrector 825, a screen corrector 826, and so on.

The interface 821 may include, for example, a serial interface (e.g., a mobile industry processor interface display serial interface (MIPI DSI)). According to various embodiments, the interface 821 may process transmission of a command (e.g., control information) and data (e.g., image) of the first processor 810 (e.g., the screen display processing unit 850).

The memory 822 may include, for example, a frame buffer. According to various embodiments, the memory 822 may record (e.g., buffer) (e.g., record the screen display region) the image transferred via the interface 821, and may be used as the term such as a video buffer, a video memory, a video RAM.

The decoder 823 may, for example, convert a coded image to the original form.

The image quality corrector 824, the brightness corrector 825, and the screen corrector 826 may process image quality, brightness or screen correction on the image to display on the display 830.

In various embodiments, the memory 840 may have the configuration identical or similar to the memory 230 of FIG. 2 or the memory 750 of FIG. 7. According to various embodiments, the memory 840 may be implemented with at least one memory electrically coupled with at least one (e.g., the first processor 810) of at least two processors (e.g., the first processor 810 and the second processor 820).

Figure 10:
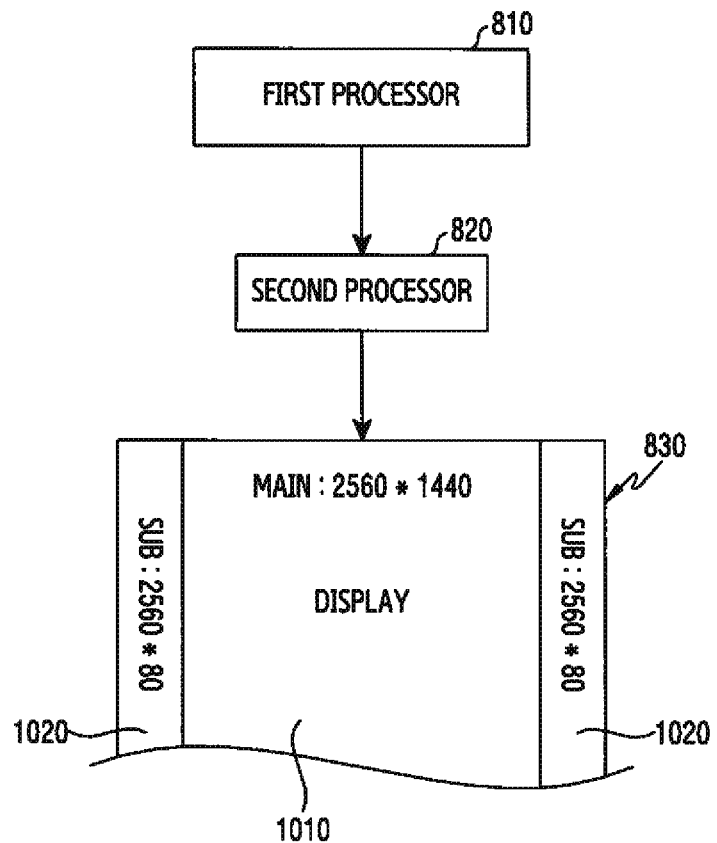
FIG. 10 illustrates a displaying operation of a display in an electronic device according to various embodiments of the present disclosure.

FIG. 10 illustrates a displaying operation of a display in an electronic device according to various embodiments of the present disclosure.

According to various embodiments, in the example of FIG. 10, it is illustrated that the electronic device 400 supports the full resolution (e.g., 2560*1600), a main region 1010 of the front supports the resolution 2560*1440, sub regions 1020 each of both sides support the resolution 2560*80, and the sum of the resolution of the main region 1010 and the resolution of the sub region 1020 corresponds to the full resolution (e.g., 2560*1600). In various embodiments, the number of the resolution is used merely to explain a specific embodiment or to ease the description and is not fixed, and may be implemented variously according to characteristics of the display 830 or the electronic device 400.

Referring to FIG. 10, the electronic device 400 adopting the curved display 830 may make the screen look larger using the sub region 1020 in the landscape or portrait mode. For example, assuming that the resolution 2560*1440 is supported through the main region 1010 of the front, 2560*1600 in total (e.g., 2056*(1440+80+80)) may be supported by expanding the resolution 2560*80 through the sub region 1020 of both sides. For example, 160 pixels may be extended using the whole sub region 1020 of both sides, or 80 pixels may be extended using the sub region 1020 of either side.

According to various embodiments, the displaying of the main region 1010 is processed at the first processor 810, and the displaying on the sub region 1020 may be processed at the second processor 820 (e.g., the DDI).

According to various embodiments, the first processor 810 may be implemented to process at least part of displaying the sub region 1020, and the second processor 820 may be implemented to process at least part of displaying the sub region 1020. For example, the processing on the displaying of the sub region 1020 may be adaptively distributed (assigned) to the first processor 810 and the second processor 820, and the second processor 820 may partially process the displaying of the second region 1020.

In the example of FIG. 10, the first processor 810 may perform image processing on the resolution 2560*1440 of the main region 1010 of the front, rather than the image processing on the full resolution 2560*1600 for the image to display, and forward a first image (e.g., the image of the resolution 2560*1440) according to the image processing to the second processor 820. If receiving the first image corresponding to the resolution of 2560*1440 of the main region 1010 from the first processor 810, the second processor 820 may process a second image (e.g., a virtual image, an imitation image; at least one 2560*80 image) to display in the sub region 1020 based on the received first image. For example, the second processor 820 may make the screen look larger through a specific processing on the sub region 1020. According to one embodiment, the second processor 820 may display the second image in the sub region 1020 through the specific processing such as pixel extension, gradation, black, or blur based on the first image. According to various embodiments, the second image may be an image including a virtual image for the sub region, an imitation image extending from the main region, or an image including a virtual image and an imitation image.

According to various embodiments, if displaying a lock screen, Internet, and a specific image, the electronic device 400 may divide and independently process the image processing of the main region 1010 and the sub region 1020 in the first processor 810 and the second processor 820, in response to a use scenario for the curved display (e.g., the main region 1010, the sub region 1020).

According to various embodiments, if determining the display mode with the image of the full resolution, the first processor 810 may forward the full resolution image (e.g., 2560*1600 image) to the second processor 820, and, if receiving the full resolution image from the first processor 810, the second processor 820 may forward the full resolution image to the display 830 as it is without the image processing operation for the sub region 1020.

According to various embodiments, the display 830 may display the image transferred from the second processor 820 through the main region 1010 or the main region 1010 and at least one sub region 1020.

As set forth above, an electronic device according to various embodiments of the present disclosure includes a display 731 and 830 including a main region of a front and a sub region of at least one side extending from the main region, and displaying an image based on at least part of the main region and the sub region, a memory 750, 840, and 822, and a processor (e.g., the control unit 780, the first processor 810) functionally coupled with the display 731 and 830 and the memory 750, 840, and 822, and the processor (e.g., the control unit 780, the first processor 810) may be configured to sense at least part of the main region, generate imitation information for an extension screen based on the sensed region, and display the extension screen in the sub region in association with a main screen of the main region based on the imitation information.

According to various embodiments, the processor may be configured to set at least part of the main region as an imitation region, and generate the imitation information by copying whole or part of the imitation region.

According to various embodiments, the imitation region may be set to a specific size from a boundary of the main region and the sub region.

According to various embodiments, the imitation region may allocate 1 pixel in the main region.

According to various embodiments, the processor may be configured to display a virtual image allocated to the sub region and an imitation image based on the imitation information, in the sub region.

According to various embodiments, the processor may be configured to determine a display mode of the imitation information, and process displaying of the extension screen based on the determined display mode.

According to various embodiments, the processor may be configured to process the displaying of the extension screen based at least in part on a hardware (H/W) pixel extension scheme, a background extension scheme, or a black extension scheme, the imitation information.

According to various embodiments, the processor may be configured to generate a first canvas for drawing the extension screen, generate a second canvas for drawing the main screen, calculate a size and a position of a view of the main screen, obtain the imitation information according to the view, draw the view on the second canvas, draw the imitation information on the first canvas, draw the first canvas and the second canvas in the memory, and display the first canvas in the sub region, at displaying the second canvas in the main region, According to various embodiments, the processor may be configured to generate one or more second canvases in response to the sub region.

According to various embodiments, the processor is configured to detect use of the electronic device, monitor a state of the electronic device in response to the use detection of the electronic device, if the state of the electronic device is a grip state, deactivate an extension function, and process the screen displaying in response to the extension function deactivation, and if the state of the electronic device is a stationary state, sense the imitation information based on the extension function, and process the screen displaying by including the imitation information.

According to various embodiments, the processor may be configured to include an application processor and a DDI.

Figure 11:
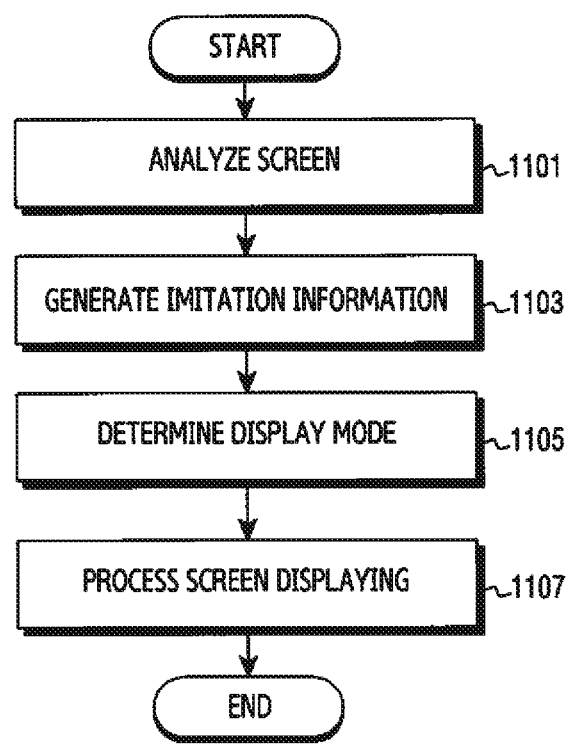
FIG. 11 is a flowchart illustrating a method for processing displaying of a display in an electronic device according to various embodiments of the present disclosure.
Figure 12:
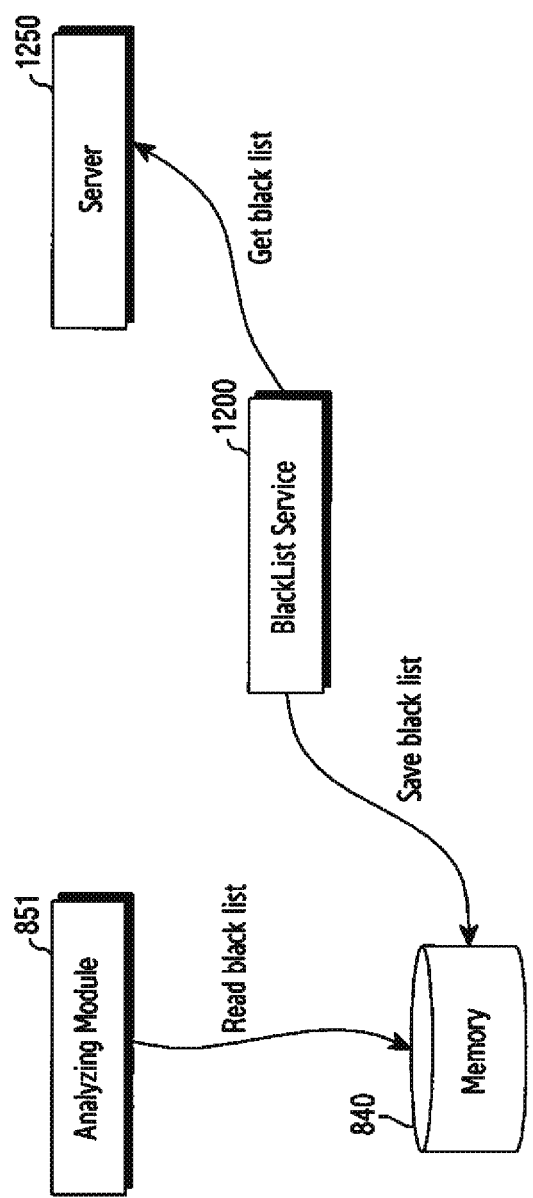
FIG. 12 illustrates an example of managing a black list in an electronic device according to various embodiments.

FIG. 11 is a flowchart illustrating a method for processing displaying of a display in an electronic device according to various embodiments of the present disclosure. FIG. 12 illustrates an example of managing a black list in an electronic device according to various embodiments.

As shown in FIG. 11, FIG. 11 illustrates, as the method for displaying the extension screen in the sub region, for example, the operation example for displaying a virtual image and an imitation image relating to the extension screen in the sub region.

Referring to FIG. 11, in operation 1101, if displaying the screen, the control unit 780 (e.g., the first processor 810 of FIG. 8) of the electronic device 400 may analyze the screen displayed on the display 830. For example, as in the example of FIG. 9, the screen of the electronic device 400 may include the layer structure of various views 971, 972, and 973. According to one embodiment, to show the views 971, 972, and 973 on the display 830, size determination, position determining and draw process of the views 971, 972, and 973 may be conducted. According to one embodiment, if the size and the position of the views 971, 972, and 973 are determined, if an x/width coordinate of a particular view is placed at the first coordinate/end coordinate of the screen x axis, the corresponding view may be determined as the view at the edge. According to one embodiment, if the size and the position of the views 971, 972, and 973 are determined, if a y/height coordinate of a particular view is placed at the first coordinate/end coordinate of the screen y axis, the corresponding view may be determined as the view at the edge.

In operation 1103, the control unit 480 may generate imitation information. For example, the control unit 780 may generate the imitation information by copying whole or part of contents of the main screen displayed in the main region. According to one embodiment, the control unit 480 may generate the imitation information based on the view of the edge based on results of the screen analysis. According to various embodiments, the control unit 480 may sense an imitation region of the main region, and generate the imitation information based on the sensing result.

In operation 1105, the control unit 480 may determine the display made of the imitation information, according to whether the view includes an object. According to one embodiment, if the corresponding view placed at the edge does not include the object (e.g., an image), the control unit 780 may determine the extension screen display (e.g., hardware (H/W) pixel extension) in hardware. For example, the control unit 780 may determine to perform the pixel extension. According to one embodiment, if the corresponding view placed at the edge includes the object (e.g., the image), the control unit 780 may determine not to conduct the hardware extension screen display. For example, it may determine not to perform the pixel extension but to perform background extension. In various embodiments, whether the corresponding view includes the object (e.g., the image) may follow a method provided by each OS of the electronic device 400. For example, if the object is an object for the image, presence of the image may be determined.

According to various embodiments, if it is impossible to apply the background extension (e.g., one image contents), it may determine to black process the sub region (e.g., the black extension scheme). According to various embodiments, in an exceptional situation, for example, if the image contents are set in the background, a black-list may be managed to black process. According to various embodiments, the above methods may be set in various manners by user selection. According to various embodiments, an example for managing the black-list is shown in FIG. 12.

As shown in FIG. 12, the electronic device 400 may request and obtain the black-list from a server 1250 (e.g., a black-list management server) which stores and manages the black-list, through a black-list service 1200 (or a black-list management application) which manages the black-list. By means of the black-list service 1200, the electronic device 400 may store the black-list obtained from the server 1250 in the memory 840. If needing the black processing as stated above, the electronic device 400 may read the black-list stored in the memory 840, using the analysis module 851, and perform the screen display processing (e.g., black processing) on the sub region based on the read black-list.

In operation 1107, the control unit 780 may process the screen displaying in response to the determined display mode. For example, the control unit 780 may process the main, screen display on the main region, the extension screen display on the sub region based on the imitation information, the sub screen display on the sub region, and so on. According to various embodiments, the screen display processing on the main region and the sub region may be distributed to and processed in the first processor and the second processor, as described earlier.

In various embodiments, the method for processing the screen display in the sub region based on the imitation information may implement the generated imitation information based on the hardware screen extension application scheme (e.g., H/W pixel extension scheme), the background extension application scheme, or the black extension scheme, as mentioned above.

According to various embodiments, the imitation information display by the pixel extension scheme may draw 1 pixel (e.g., the imitation region) of the edges of the main region in hardware in an alpha channel (or an alpha region), for example, in the drawing. According to various embodiments, the alpha channel may indicate a channel additionally set in a default region (or a default channel) for processing the image processing task more easily and effectively. For example, a general screen includes three channels, for example, an image may be created by combining three lights of R, G, and B, a fourth channel besides those three channels is referred to as the alpha channel, and the channel for synthesizing with other image includes white and black. For example, if the color of one pixel on graphics overlaps the color of other pixel, the alpha channel enables the two colors to effectively fuse, which may be effective in animation task. According to one embodiment, provided that the image of the alpha channel is A and a screen to synthesize is B, a white portion of the alpha channel of the screen A may present the image of A, and a black portion may become transparent to present the image of B corresponding to the background.

According to various embodiments, the imitation information display by the background extension application scheme may generate a canvas (e.g., 1×Height Canvas) for the sub regions (e.g., both sub regions), for example, before analyzing the view layer structure. If each of the views are positioned in the sub region (e.g., an edge portion) at the drawing, a background image may be drawn on the canvas with one pixel (e.g., the pixel corresponding to the imitation region). Next, if the draw of the final view is finished, the extension screen may be drawn at the same time as the main screen, by drawing the generated canvas at the edges if the main screen is displayed, and drawing the drawn canvas in the alpha channel through hardware. According to various embodiments, the background extension application scheme may be implemented with a combination of hardware and software to be described. This is explained by referring to the drawings to be described.

According to various embodiments, the imitation information display by the black extension scheme, for example, the black extension scheme may allow a method not setting the frame buffer (e.g., the memory 822 of FIG. 8) of the alpha channel. However, since this may cause an animation problem, the background image may be set to the block color for natural animation between the screens.

As above, the imitation information for the extension screen may be generated and displayed in the sub region using various methods. Meanwhile, if performing the operation for substantially showing the imitation information (e.g., the imitation image), the virtual image allocated to the sub region and the imitation information (e.g., the imitation image) corresponding to the extension screen may overlap, and in this case, unnatural animation may be presented. An example thereof is shown in FIG. 13.

Figure 13:
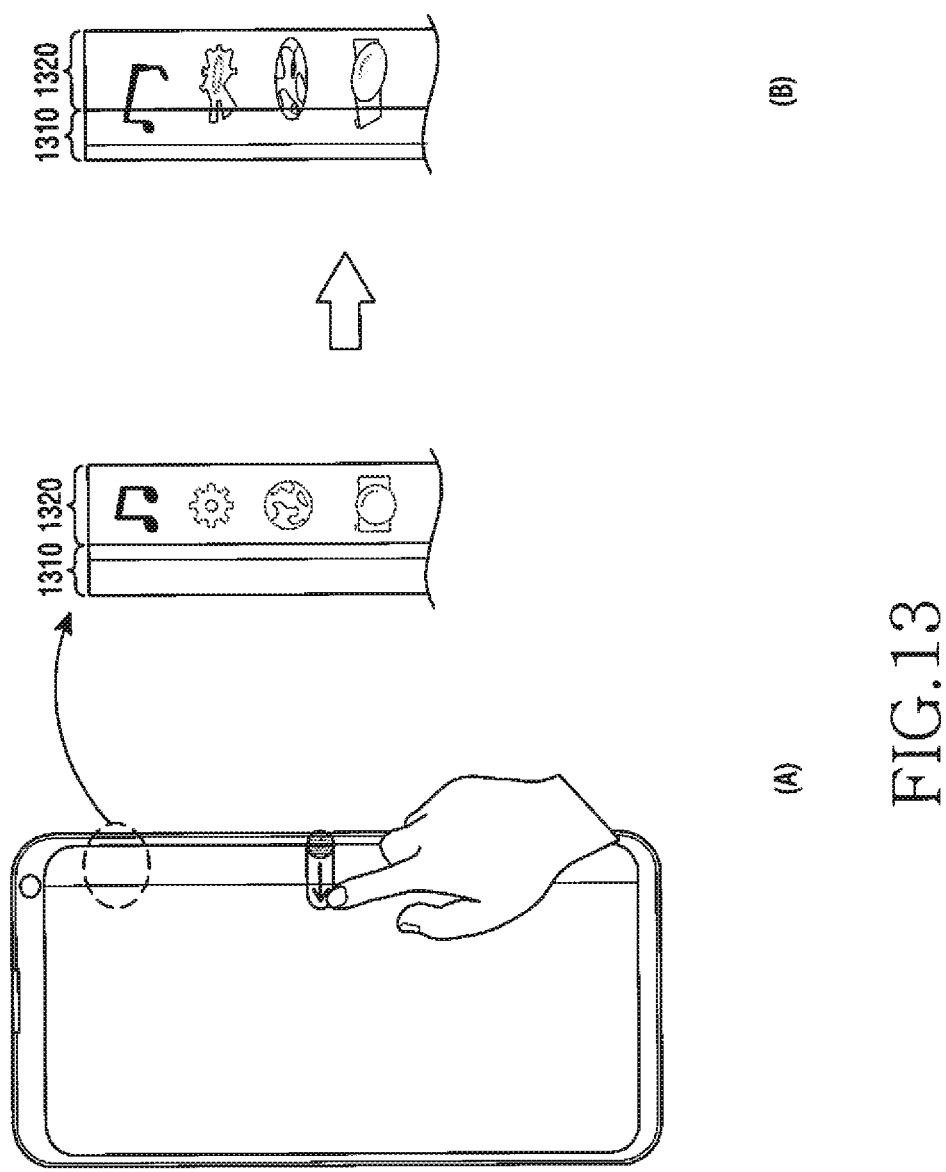
FIG. 13 illustrates a displaying example of a sub region in an electronic device according to various embodiments.

FIG. 13 illustrates a displaying example of a sub region in an electronic device according to various embodiments.

Referring to FIG. 13, as shown in the example (A), the user may perform an operation for displaying a specific screen (e.g., a relevant screen such as notification contents, notification color or progress (e.g., alarm, player, etc.)) in a sub region 1320, based on a user input (e.g., touch or touch & drag, etc.) to the sub region 1320. In response to the user input, the electronic device 400 may display a virtual image corresponding to the sub screen in the sub region 1320. In so doing, the electronic device 400 may also perform an operation for displaying imitation information (e.g., an imitation image copied based on an imitation region 1310) in the sub region 1320, as aforementioned. In this case, as shown in the example (B), the virtual image allocated to the sub region 1320 and the imitation information (e.g., the imitation image) corresponding to the extension screen may overlap, to thus present unnatural animation.

Hereafter, according to various embodiments, a specific method for enhancing the unnatural animation in the sub region of the electronic device 400 is explained.

Figure 14:
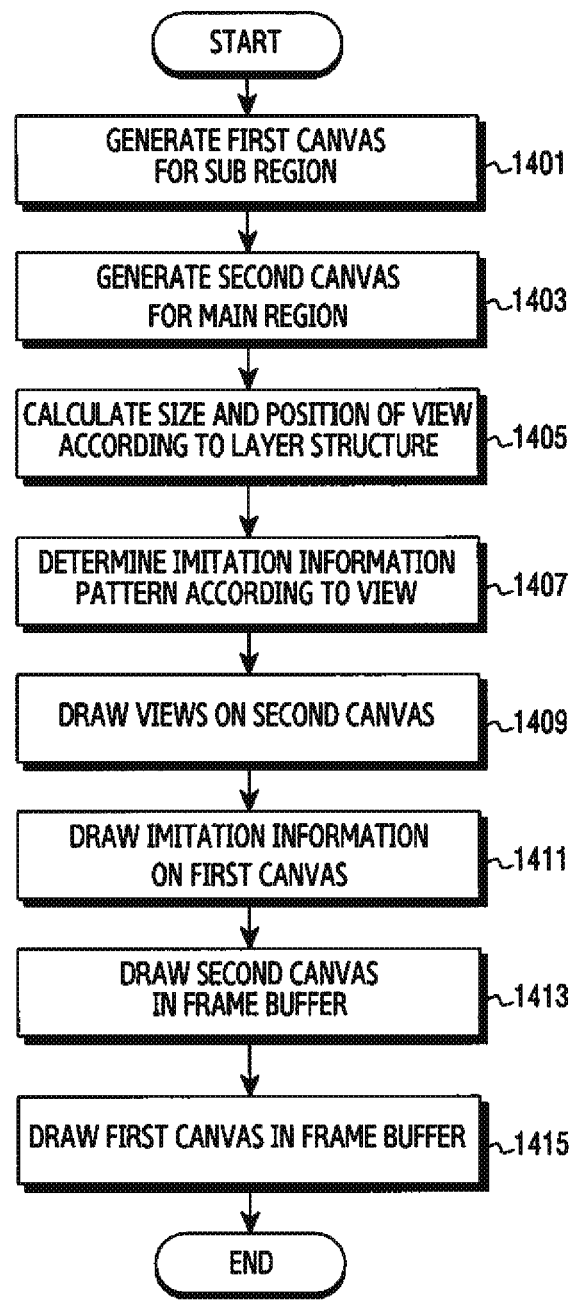
FIG. 14 is a flowchart illustrating a method for processing displaying of a display in an electronic device according to various embodiments of the present disclosure.

FIG. 14 is a flowchart illustrating a method for processing displaying of a display in an electronic device according to various embodiments of the present disclosure.

Referring to FIG. 14, in operation 1401, the control unit 780 (e.g., the first processor 810 of FIG. 8) of the electronic device 400 may generate a canvas (e.g., a first canvas) for the sub region. For example, the control unit 780 may generate the canvas for drawing the extension screen (e.g., the image corresponding to 1 pixel of the imitation region) displayed on the sub region. According to various embodiments, the control unit 780 may generate at least one canvas for the sub region of any one side. For example, the control unit 780 may generate one or more canvases corresponding to the operation of the sub region (or the number of the configured sub regions). According to one embodiment, if using the left and right sub regions, the control unit 780 may generate two canvases for the left and right sub regions. According to one embodiment, if using the upper and lower sub regions, the control unit 780 may generate two canvases for the upper and lower sub regions. According to one embodiment, if using the left, right, upper, and lower sub regions, the control unit 780 may generate four canvases for the left, right, upper, and lower sub regions. According to one embodiment, if using only one side, the control unit 780 may generate one canvas for a corresponding sub region. According to various embodiments, if generating the canvas, the control unit 780 may generate the canvas to have a particular height (e.g., 1×Height) corresponding to the corresponding sub region.

In operation 1403, the control unit 780 may generate a canvas (e.g., a second canvas) for the main region. For example, the control unit 780 may generate the canvas for drawing the main screen displayed in the main region.

In operation 1405, the control unit 780 may calculate a size and a position of the view according to the layer structure. For example, the screen of the electronic device 400 may include the layer structure of various views, and the control unit 780 may calculate the size and the position of various views of the main screen, and determine the view for sensing (or acquiring) imitation information.

In operation 1407, the control unit 780 may acquire the imitation information according to the view. For example, the control unit 780 may determine a pattern of the imitation information. According to one embodiment, by copying contents of the imitation region of a particular pixel (e.g., 1 pixel) allocated in the main region, the control unit 780 may acquire an imitation image corresponding to the image displayed in the imitation region, and analyze the pattern of the acquired imitation image.

In operation 1409, the control unit 780 may draw the views on the second canvas. For example, the control unit 780 may draw the views of the main screen displayed in the main region on the canvas for the main region.

In operation 1411, the control unit 780 may draw the imitation information on the first canvas. For example, the control unit 780 may draw the imitation information (e.g., the imitation image) for the extension screen displayed in the sub region on the canvas for the sub region.

In operation 1413, the control unit 780 may draw the first canvas in the frame buffer.

In operation 1415, the control unit 780 may draw the second canvas in the frame buffer.

Next, the control unit 780 may display the first canvas as the extension screen in the sub region, at displaying the second canvas in the main region.

Figure 15:
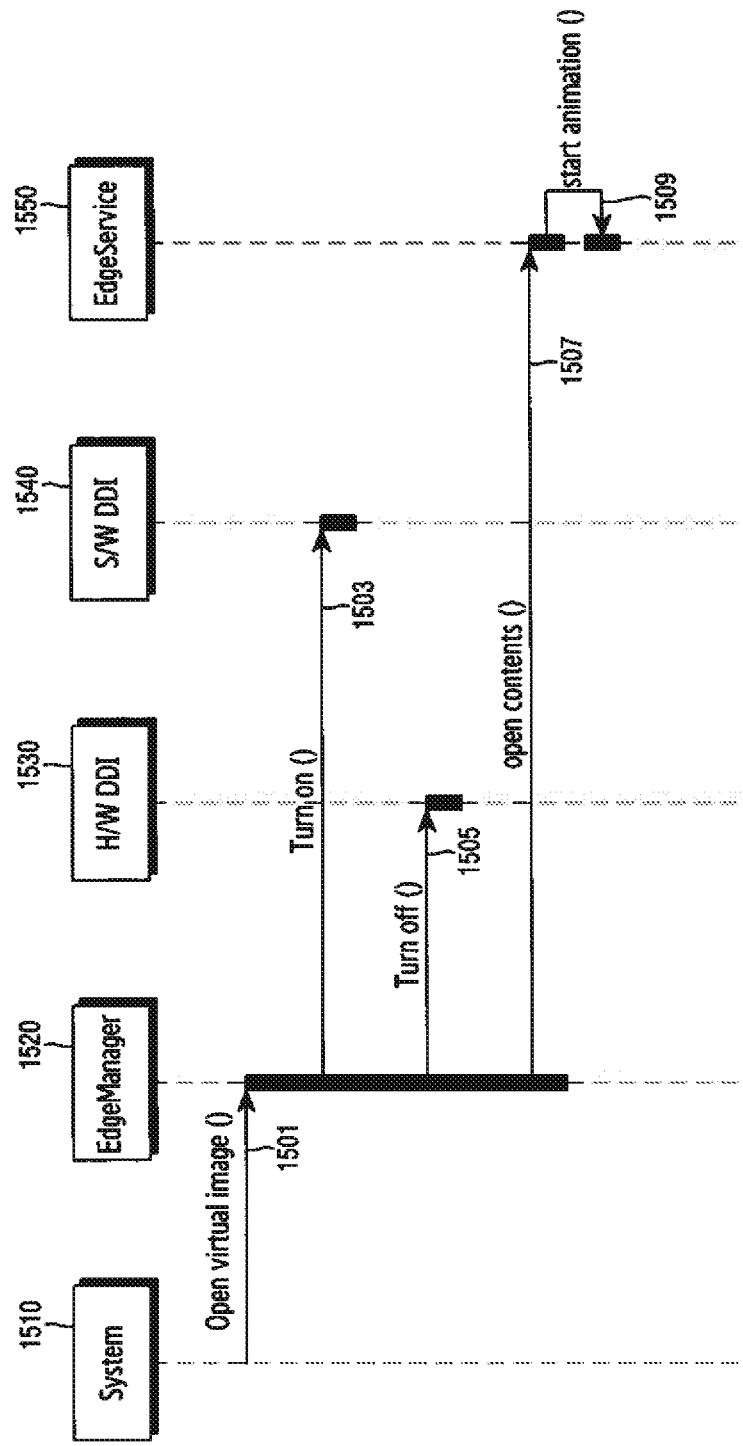
FIG. 15 illustrates an example of operating a sub region in an electronic device according to various embodiments of the present disclosure.

FIG. 15 illustrates an example of operating a sub region in an electronic device according to various embodiments of the present disclosure.

As shown in FIG. 15, the electronic device 400 may include a system 1510, an edge manager 1520 (e.g., a sub region manager), a hardware DDI 1530, a software DDI 1540, and an edge service 1550.

Referring to FIG. 15, in operation 1501, the system 1510 may forward (notify) open of a virtual display to the edge manager 1520.

In operation 1503 and operation 1505, the edge manager 1520 may turn on the software DDI 1540, and turn off the hardware DDI 1530 in response to the virtual display open.

In operation 1507, the edge manager 1520 may open and forward contents to the edge service 1550.

In operation 1509, the edge service 1550 may initiate animation corresponding to the contents.

As shown in FIG. 15, the electronic device 400 may open the image (e.g., a virtual image, an imitation image) for the sub region. For example, since the electronic device 400 uses the hardware module, the main region of the display (e.g., the display 830 of FIG. 8) may present an image (e.g., a virtual image, a copy image) relating to the sub region. As such, if the image to display in the sub region appears in the main region, it may cause difference to the user. Hence, in various embodiments, before the image appears, the software DDI 1540 (e.g., the extension screen displaying module 855 operating in software in FIG. 8) which supports the Z-order may be configured, to thus turn off the hardware DDI 1530 (e.g., the extension screen displaying module 855 operating in hardware or the second processor 820 in FIG. 8) and then turn on the software DDI 1540. Next, the electronic device 400 may display the image (e.g., the virtual image, the imitation image) naturally in the sub region through the image processing by the software DDI 1540.

Figure 16:
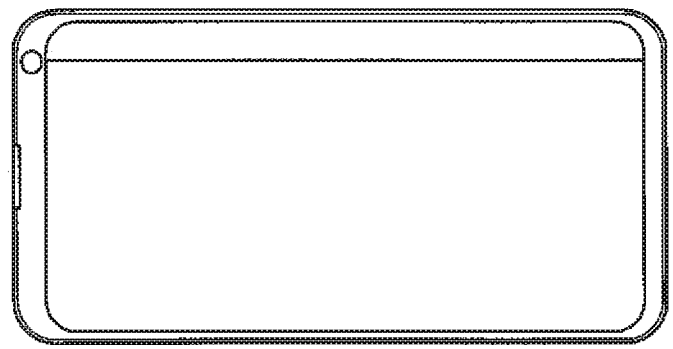
FIG. 16 illustrates another example of operating a sub region in an electronic device according to various embodiments of the present disclosure.
Figure 16:
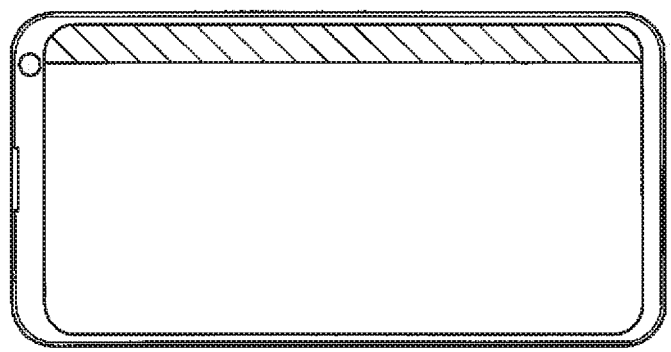
Figure 16:
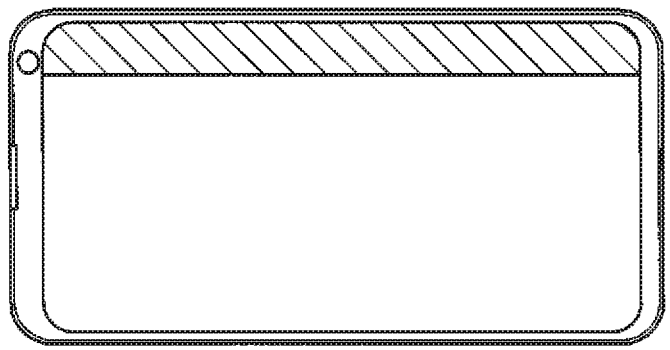

FIG. 16 illustrates another example of operating a sub region in an electronic device according to various embodiments of the present disclosure.

According to various embodiments, if displaying an image (e.g., a virtual image, an imitation image) for the sub region, unlike the example of FIG. 15, the electronic device 400 may first display the image corresponding to the sub region and then turn off the hardware DDI 1530, without configuring the software DDI 1540. Next, the electronic device 400 may display the image according to acceleration. According to one embodiment, the extension screen may be displayed in the sub region without animation, as shown in the example <A> and the example <B> of FIG. 16, and then, the extension screen may be displayed in the sub region together with the animation, as shown in the example <C>. According to various embodiments, if the sub region is small (e.g., the width of the sub region is narrow), the extension screen may be displayed more naturally by the acceleration.

So far, while the sub region of the present disclosure is implemented on the left side and the right side by way of example and its operations have been described, various embodiments are not limited thereto, and the extension screen may be implemented in the same manner as aforementioned by using the upper and lower sub regions as the extension screen region even if the sub region is implemented on the upper side and the lower side.

Figure 17:
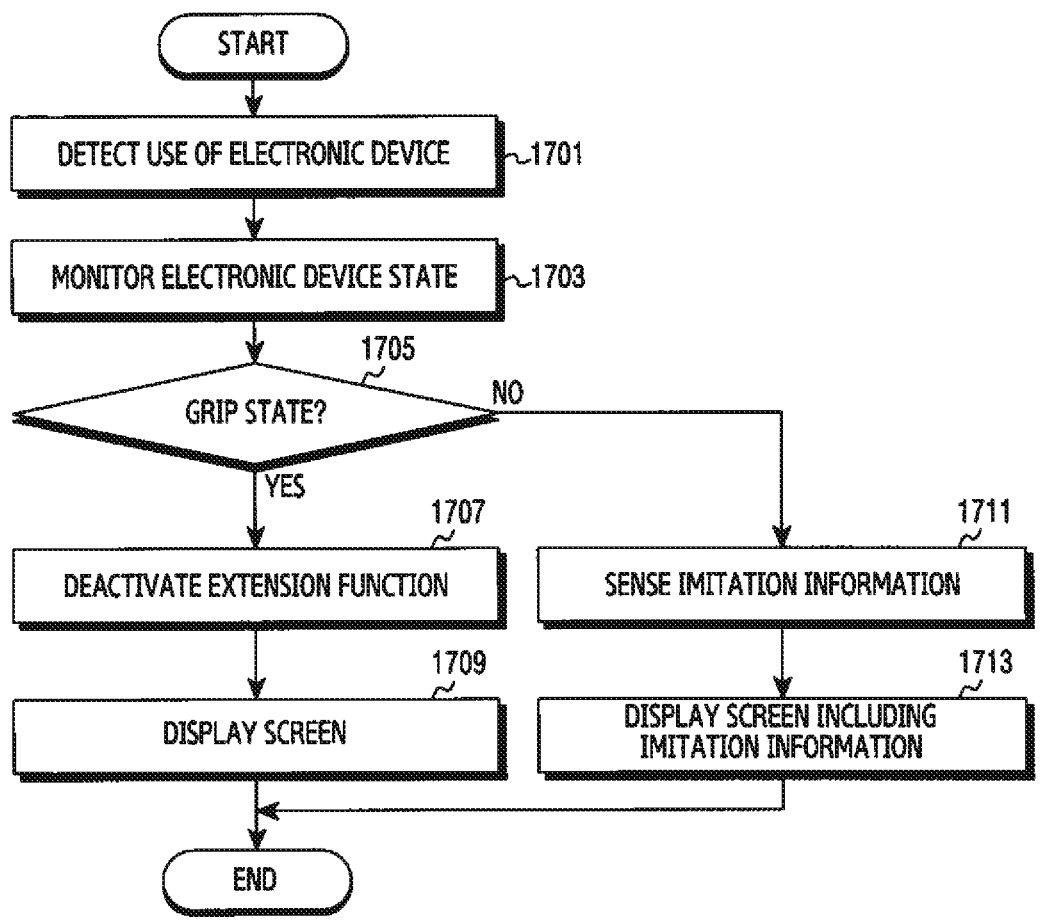
FIG. 17 is a flowchart illustrating an example of processing displaying of a display in an electronic device according to various embodiments of the present disclosure.

FIG. 17 is a flowchart illustrating an example of processing displaying of a display in an electronic device according to various embodiments of the present disclosure.

Referring to FIG. 17, in operation 1701, the control unit 780 of the electronic device 400 may detect use of the electronic device 400. According to one embodiment, the user may turn on the display by manipulating the electronic device 400. According to one embodiment, the electronic device 400 may receive various data from an external device or a server. According to various embodiments, the user's use of the electronic device 400, the data reception from the outside, and so on may be set as a trigger for using the electronic device 400.

In operation 1703, the control unit 780 may monitor (or determine) a state of the electronic device 400. For example, using at least one sensor (e.g., the sensor module 240 of FIG. 2) of the electronic device 400, the control unit 780 may determine the state (e.g., various states such as a posture, an acceleration, and a tilt of the electronic device 400, touch or pressure by the grip, charging, etc.) of the electronic device 400.

In operation 1705, based on the monitoring result of operation 1703, the control unit 780 may determine whether the electronic device 400 is gripped by the user or is stationary on the floor (or a wireless charging pad).

In operation 1705, if determining that the state of the electronic device 400 is the grip state (YES of operation 1705), the control unit 780 may deactivate (or turn off) the extension function, in operation 1707.

In operation 1709, the control unit 780 may process the screen display in response to the extension function deactivation. For example, the control unit 780 may restrict the use of the sub region, and process to display the screen and to receive a touch input based on the main region.

In operation 1705, if determining that the state of the electronic device 400 is not the grip state, for example, if determining that the state of the electronic device 400 is the stationary state (NO of operation 1705), the control unit 780 may sense imitation information based on the extension function, in operation 1711. For example, the control unit 780 may generate the imitation information for the extension screen by copying the imitation region of the main region, as stated earlier.

In operation 1713, the control unit 780 may process the screen display by including the imitation information. For example, the control unit 780 may include and display the extension screen according to the virtual image allocated to the sub region and the imitation information.

Figure 18:
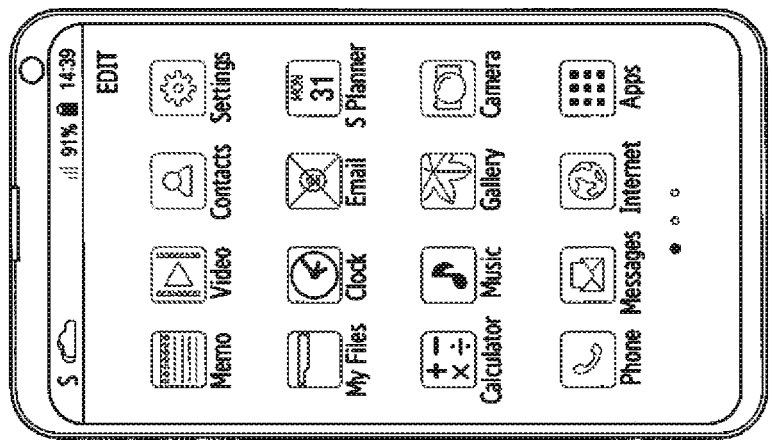
FIG. 18 illustrates an example of providing an extension screen in an electronic device according to various embodiments of the present disclosure.
Figure 18:
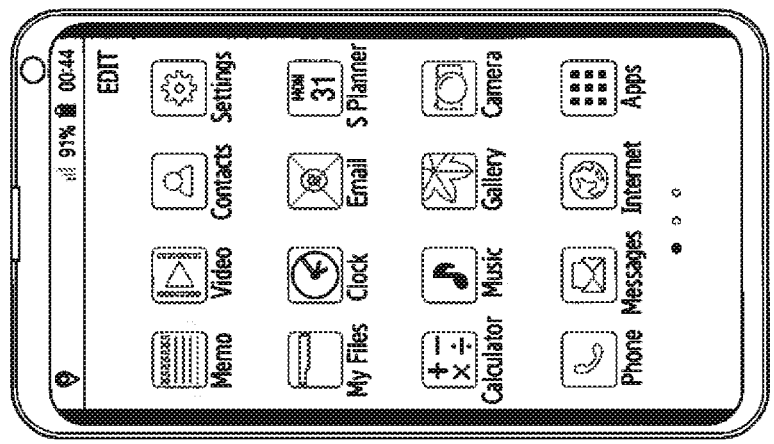

FIG. 18 illustrates an example of providing an extension screen in an electronic device according to various embodiments of the present disclosure.

As shown in FIG. 18, the example <A> and the example <B> of FIG. 18 depict operation examples of the extension screen according to various embodiments.

Referring to FIG. 18, as shown in the example <A>, in operating the extension screen using the sub region, to improve user concentration of the main screen while the user manipulates the electronic device, the extension screen may be reduced and displayed at edges. For example, the width of the sub region may be operated narrowly. In this case, as shown in the example <A>, the extension screen of the sub region may be displayed as the bezel type of contents irrelevant to the main screen of the main region, to thus cause difference between the main screen and the extension screen.

By contrast, in various embodiments, as shown in the example <B>, in operating the extension screen using the sub region, the extension screen may be displayed by reference processing contents of the main screen. Hence, compared to the example <A>, the example <B> may lessen the disconnected difference between the main screen and the extension screen. According to various embodiments, as the extension screen is implemented by reference processing the contents of the main screen, distortion phenomenon of the main screen may be avoided. In various embodiments, the example <B> may show the example implemented with the H/W pixel extension scheme.

FIG. 19A, FIG. 19B, FIG. 19C, FIG. 19D and FIG. 19E are diagrams illustrating examples of providing an extension screen of various types in an electronic device according to various embodiments of the present disclosure.

Figure 19A:
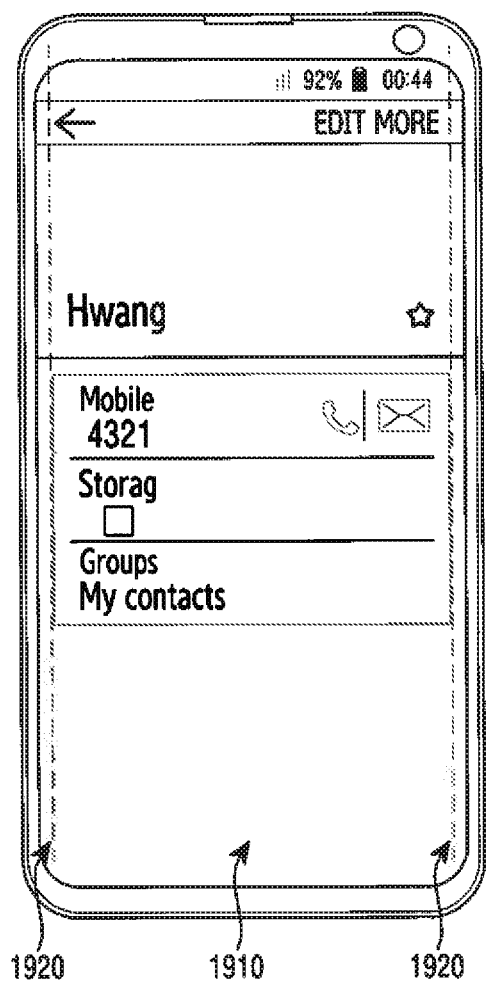
FIG. 19A, FIG. 19B, FIG. 19C, FIG. 19D and FIG. 19E illustrates examples of providing an extension screen of various styles in an electronic device according to various embodiments of the present disclosure.
Figure 19B:
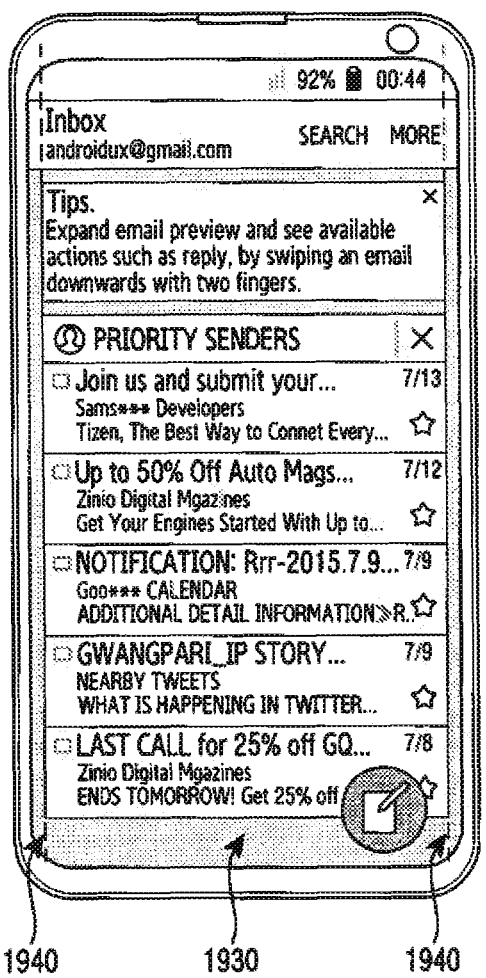

Referring to FIG. 19A and FIG. 19B, FIG. 19A and FIG. 19B may depict the example of implementing extension screens 1920 and 1940 with the H/W pixel extension scheme as in the example <B> of FIG. 18 above-stated according to various embodiments. For example, 1 pixel (e.g., an imitation region) of edges of the main region (e.g., a contents region) in the draw may be drawn in a screen alpha channel (or an alpha region). According to various embodiments, as the extension screens 1920 and 1940 are implemented in both sub regions by reference processing the contents of the main screens 1910 and 1930 of the main region, distortion phenomenon of the main screens 1910 and 1930 may be avoided and difference by the extension screens 1920 and 1940 between the main region and the sub region may be reduced.

Figure 19C:
Figure 19D:
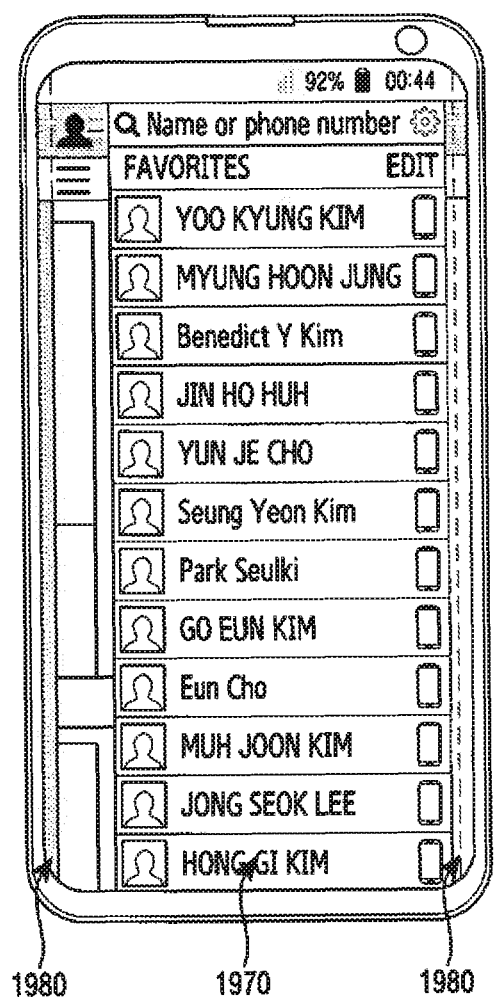

Referring to FIG. 19C and FIG. 19D, FIG. 19C and FIG. 19D may depict the example of implementing extension screens 1950 and 1970 with the background extension scheme according to various embodiments. For example, according to various embodiments, the electronic device 400 may generate a canvas for the sub region before analyzing the view layer structure. If each of the views is placed in the sub region (e.g., the edge portion) at the draw, the electronic device 400 may draw the background image in 1 pixel on the canvas. Next, if the draw of the last view is finished, extension screen 1960 and 1980 may be drawn at the same time as the main screen, by drawing the generated canvas at the edges in displaying the main screen 1950 and 1970, and drawing the drawn canvas in the alpha channel in hardware.

Figure 19E:
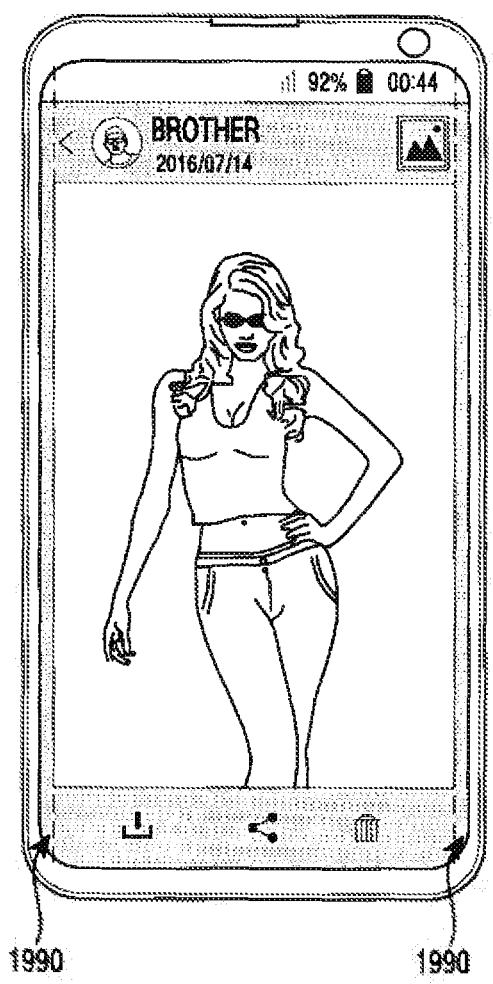

Referring to FIG. 19E, FIG. 19E may depict the example of implementing an extension screen 1990 with the black extension scheme, according to various embodiments. For example, the black extension scheme may set and provide the background image in the black color.

As set forth above, an operating method of an electronic device according to various embodiments may include, if displaying a screen on a display 731 and 830, sensing at least part of a main region divided in the display 731 and 830, generating imitation information for an extension screen based on the sensed region, and displaying the extension screen in a sub region divided in the display in association with a main screen of the main region based on the imitation information, wherein the display 731 and 830ma may include the main region of a front and the sub region of at least one side extending from the main region, and displays an image based on at least part of the main region and the sub region According to various embodiments, the generating may include setting at least part of the main region as an imitation region, and generating the imitation information by copying whole or part of the imitation region, According to various embodiments, the setting may include setting a specific size from a boundary of the main region and the sub region, and the specific size may include allocating 1 pixel in the main region.

According to various embodiments, the displaying may include displaying a virtual image allocated to the sub region and an imitation image based on the imitation information, in the sub region.

According to various embodiments, the displaying may include determining a display mode of the imitation information, and processing displaying of the extension screen based on the determined display mode.

According to various embodiments, the processing the displaying of the extension screen may include processing the displaying the imitation information for the extension screen based at least in part on a hardware (H/W) pixel extension scheme, a background extension scheme, or a black extension scheme, the imitation information.

According to various embodiments, the method may include generating a first canvas for drawing the extension screen, generating a second canvas for drawing the main screen, calculating a size and a position of a view of the main screen, obtaining the imitation information according to the view, drawing the view on the second canvas, drawing the imitation information on the first canvas, drawing the first canvas and the second canvas in the memory, and displaying the first canvas in the sub region, at displaying the second canvas in the main region.

According to various embodiments, generating the first canvas may include generating one or more first canvases in response to the sub region.

According to various embodiments, the method may include detecting use of the electronic device, monitoring a state of the electronic device in response to the use detection of the electronic device, if the state of the electronic device is a grip state, deactivating an extension function, and processing the screen displaying in response to the extension function deactivation, and if the state of the electronic device is a stationary state, sensing the imitation information based on the extension function, and processing the screen displaying by including the imitation information.

The various embodiments of the present disclosure disclosed in the specification and the drawings merely present specific examples to easily explain technical details of the present disclosure and to ease the understanding, and are not intended to limit the range of the present disclosure. Therefore, the scope of the present disclosure should be construed as encompassing all changes or modifications derived based on the technical idea of the present disclosure as well the disclosed embodiments.

The invention claimed is:

1. An electronic device comprising:
a display comprising a main region of a front and a sub region of at least one side extending from the main region, and displaying an image based on at least part of the main region and the sub region;
a memory; and
a processor functionally coupled with the display and the memory, the processor configured to:
sense an imitation region included in the main region, wherein the imitation region is set to a specific size from a boundary of the main region and the sub region,
generate imitation information for an extension screen based on the imitation region, and
while maintaining a main screen in the main region, display the extension screen in the sub region in association with the main screen based on the imitation information.

2. The electronic device of claim 1, wherein the processor is configured to:
generate the imitation information by copying whole or part of the imitation region.

3. The electronic device of claim 2, wherein the imitation region allocates 1 pixel in the main region.

4. The electronic device of claim 1, wherein the processor is further configured to:
display a virtual image allocated to the sub region and an imitation image based on the imitation information, in the sub region.

5. The electronic device of claim 1, wherein the processor is further configured to:
determine a display mode of the imitation information, and
process displaying of the extension screen based on the determined display mode.

6. The electronic device of claim 5, wherein the processor is further configured to:
process the displaying the imitation information for the extension screen based at least in part on a hardware (H/W) pixel extension scheme, a background extension scheme, or a black extension scheme.

7. The electronic device of claim 1, wherein the processor is further configured to:
generate a first canvas for drawing the extension screen,
generate a second canvas for drawing the main screen,
calculate a size and a position of a view of the main screen,
obtain the imitation information according to the view,
draw the view on the second canvas,
draw the imitation information on the first canvas,
draw the first canvas and the second canvas in the memory, and
display the first canvas in the sub region, at displaying the second canvas in the main region.

8. The electronic device of claim 7,
wherein the processor is further configured to, if generating the first canvas, generate one or more first canvases in response to the sub region.

9. The electronic device of claim 1, wherein the processor is further configured to:
detect use of the electronic device,
monitor a state of the electronic device in response to the use detection of the electronic device,
if the state of the electronic device is a grip state, deactivate an extension function, and process the screen displaying in response to the extension function deactivation, and
if the state of the electronic device is a stationary state, sense the imitation information based on the extension function, and process the screen displaying by comprising the imitation information.

10. The electronic device of claim 1, wherein the processor is further configured to comprise:
an application processor; and
a display driver integrated circuit (DDI).

11. A displaying method of an electronic device, comprising:
if displaying a screen on a display, sensing an imitation region included in a main region divided in the display, wherein the imitation region is set to a specific size from a boundary of the main region and a sub region divided in the display;
generating imitation information for an extension screen based on the imitation region; and
while maintaining a main screen in the main region, displaying the extension screen in the sub region in association with the main screen based on the imitation information,
wherein the display comprises the main region of a front and the sub region of at least one side extending from the main region, and displays an image based on at least part of the main region and the sub region.

12. The method of claim 11, wherein generating imitation information comprises:
generating the imitation information by copying whole or part of the imitation region.

13. The method of claim 12,
wherein the specific size allocates 1 pixel in the main region.

14. The method of claim 11, wherein displaying a screen comprises:
displaying a virtual image allocated to the sub region and an imitation image based on the imitation information, in the sub region.

15. The method of claim 11, wherein displaying a screen comprises:
determining a display mode of the imitation information; and
processing displaying of the extension screen based on the determined display mode.

16. The method of claim 15, wherein processing the displaying of the extension screen comprises:
processing the displaying the imitation information for the extension screen based at least in part on a hardware (H/W) pixel extension scheme, a background extension scheme, or a black extension scheme.

17. The method of claim 11, comprising:
generating a first canvas for drawing the extension screen;
generating a second canvas for drawing the main screen;
calculating a size and a position of a view of the main screen;
obtaining the imitation information according to the view;
drawing the view on the second canvas;
drawing the imitation information on the first canvas;
drawing the first canvas and the second canvas in a memory of the electronic device; and
displaying the first canvas in the sub region, at displaying the second canvas in the main region.

18. The method of claim 17, wherein generating the first canvas comprises:
generating one or more first canvases in response to the sub region.

19. The method of claim 11, comprising:
detecting use of the electronic device;
monitoring a state of the electronic device in response to the use detection of the electronic device;
if the state of the electronic device is a grip state, deactivating an extension function, and processing the screen displaying in response to the extension function deactivation; and
if the state of the electronic device is a stationary state, sensing the imitation information based on the extension function, and processing the screen displaying by comprising the imitation information.

* * * * *